(12) United States Patent
Matsuda et al.

(10) Patent No.: US 11,375,496 B2
(45) Date of Patent: Jun. 28, 2022

(54) WIRELESS COMMUNICATION DEVICE AND WIRELESS COMMUNICATION METHOD

(71) Applicant: SONY CORPORATION, Tokyo (JP)

(72) Inventors: Hiroki Matsuda, Tokyo (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 16/959,732

(22) PCT Filed: Dec. 21, 2018

(86) PCT No.: PCT/JP2018/047239
§ 371 (c)(1),
(2) Date: Jul. 2, 2020

(87) PCT Pub. No.: WO2019/138847
PCT Pub. Date: Jul. 18, 2019

(65) Prior Publication Data
US 2020/0389881 A1  Dec. 10, 2020

(30) Foreign Application Priority Data

Jan. 11, 2018 (JP) .............................. JP2018-002806

(51) Int. Cl.
*H04W 72/04* (2009.01)
*H04W 48/08* (2009.01)

(52) U.S. Cl.
CPC ......... *H04W 72/044* (2013.01); *H04W 48/08* (2013.01); *H04W 72/048* (2013.01)

(58) Field of Classification Search
None
See application file for complete search history.

(56) References Cited

U.S. PATENT DOCUMENTS

| 11,139,937 B2* | 10/2021 | Kim ..................... H04L 5/0051 |
| 2015/0312074 A1 | 10/2015 | Zhu et al. |
| 2018/0254807 A1* | 9/2018 | Takeda .................. H04W 72/04 |

FOREIGN PATENT DOCUMENTS

| JP | 2017-515361 A | 6/2017 |
| WO | 2015/167714 A1 | 11/2015 |

OTHER PUBLICATIONS

"3rd Generation Partnership Project; Technical Specification Group Radio Access Network; Study on Downlink Multiuser Superposition Transmission (MUST) for LTE, (Release 13)", 3GPP TR 36.859, V13.0.0, Technical Report, Dec. 2015, 48 pages.

(Continued)

*Primary Examiner* — Hong S Cho
(74) *Attorney, Agent, or Firm* — Chip Law Group

(57) ABSTRACT

A wireless communication device is provided that is capable of improving transmission efficiency of the entire system. The wireless communication device includes a communication unit and a control unit. The communication unit transmits and receives a signal by wireless communication. The control unit controls use of a resource used for the wireless communication by the communication unit. A part of a resource used to transmit a signal by wireless communication with a first terminal device is used as a resource used to transmit another signal different from the signal exclusively or using by non-orthogonal multiplexing, and the resource used to transmit the another signal has at least a first channel for data. The control unit controls whether the first channel in the resource used to transmit the another signal is used exclusively or used using by non-orthogonal multiplexing.

14 Claims, 33 Drawing Sheets

(56) References Cited

OTHER PUBLICATIONS

"Discussion on multiple access for eMBB", NTT Docomo, Inc., 3GPP TSG Ran WG1, 86th Meeting, Lisbon, Portugal, R1-1610076, Oct. 10-14, 2016, 05 pages.
"Remaining issues in Pre-emption Indicator", Sony, 3GPP TSG RAN WG1, 91st Meeting, Reno, USA, R1-1720463, Nov. 27-Dec. 1, 2017, 06 pages.
"Summary of e-mail discussions on multiplexing eMBB and URLLC in DL", Samsung, TSG RAN WG1 NR, Ad-Hoc Meeting, Spokane, USA, R1-1700972, Jan. 16-20, 2017, 23 pages.
"Preemption/superposition-based Multiplexing of eMBB and URLLC", InterDigital Communications, 3GPP TSG RAN WG1, AH_NR Meeting, R1-1700721, Jan. 16-20, 2017, 05 pages.
"Performance of Superposition-based DL Multiplexing for eMBB and URLLC", Samsung, 3GPP TSG RAN WG1, 88th Meeting, Athens, Greece, R1-1702998, Feb. 13-17, 2017, 05 pages.
"URLLC DL pre-emption and UL Suspension indication channel design", QualComm incorporated, 3GPP TSG RAN WG1, NR Ad-Hoc, 3rd Meeting, Nagoya, Japan, R1-1716434, Sep. 18-21, 2017, 09 pages.
International Search Report and Written Opinion of PCT Application No. PCT/JP2018/047239, dated Apr. 2, 2019, 09 pages of ISRWO.

\* cited by examiner

FIG.3

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

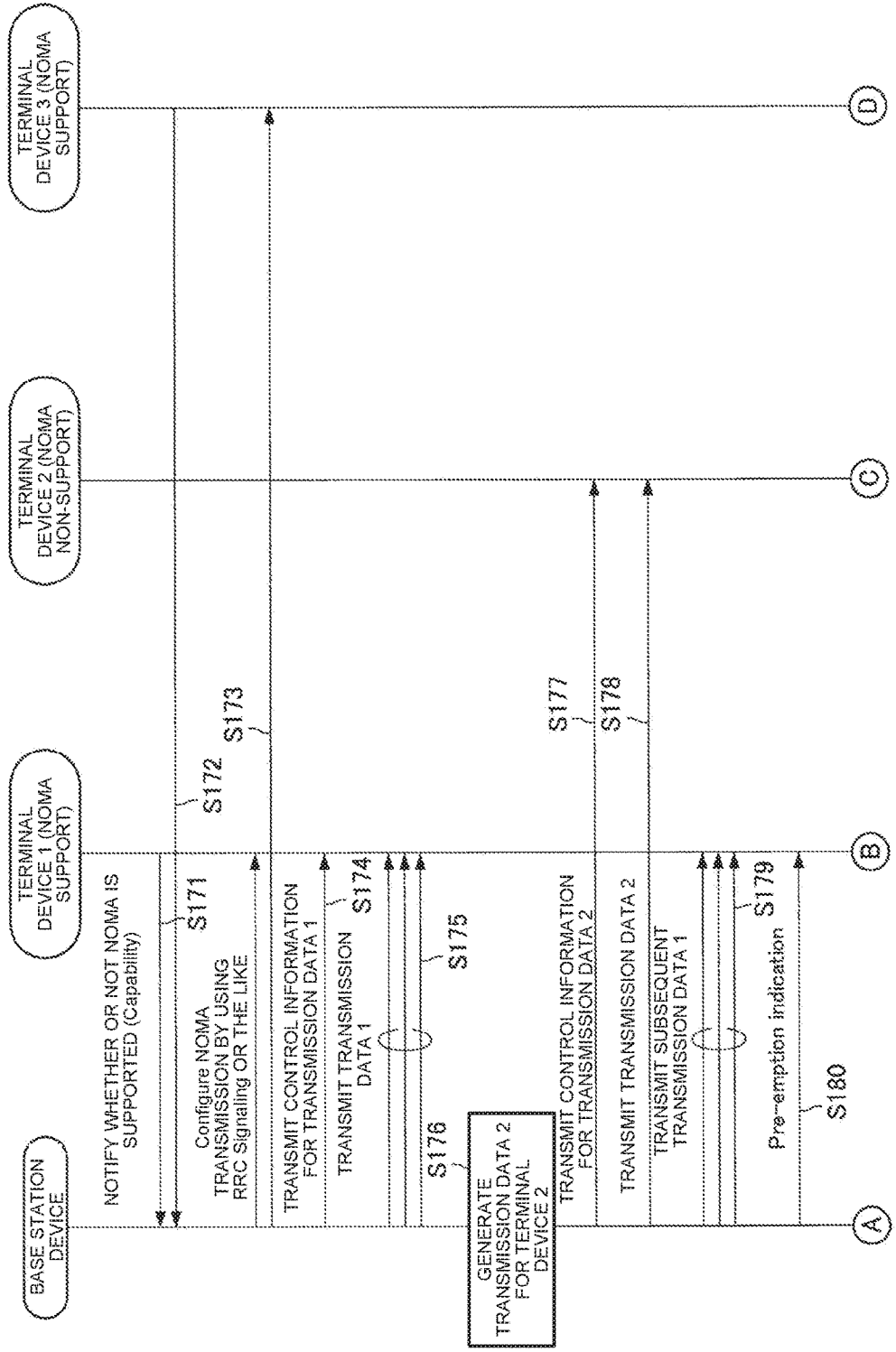

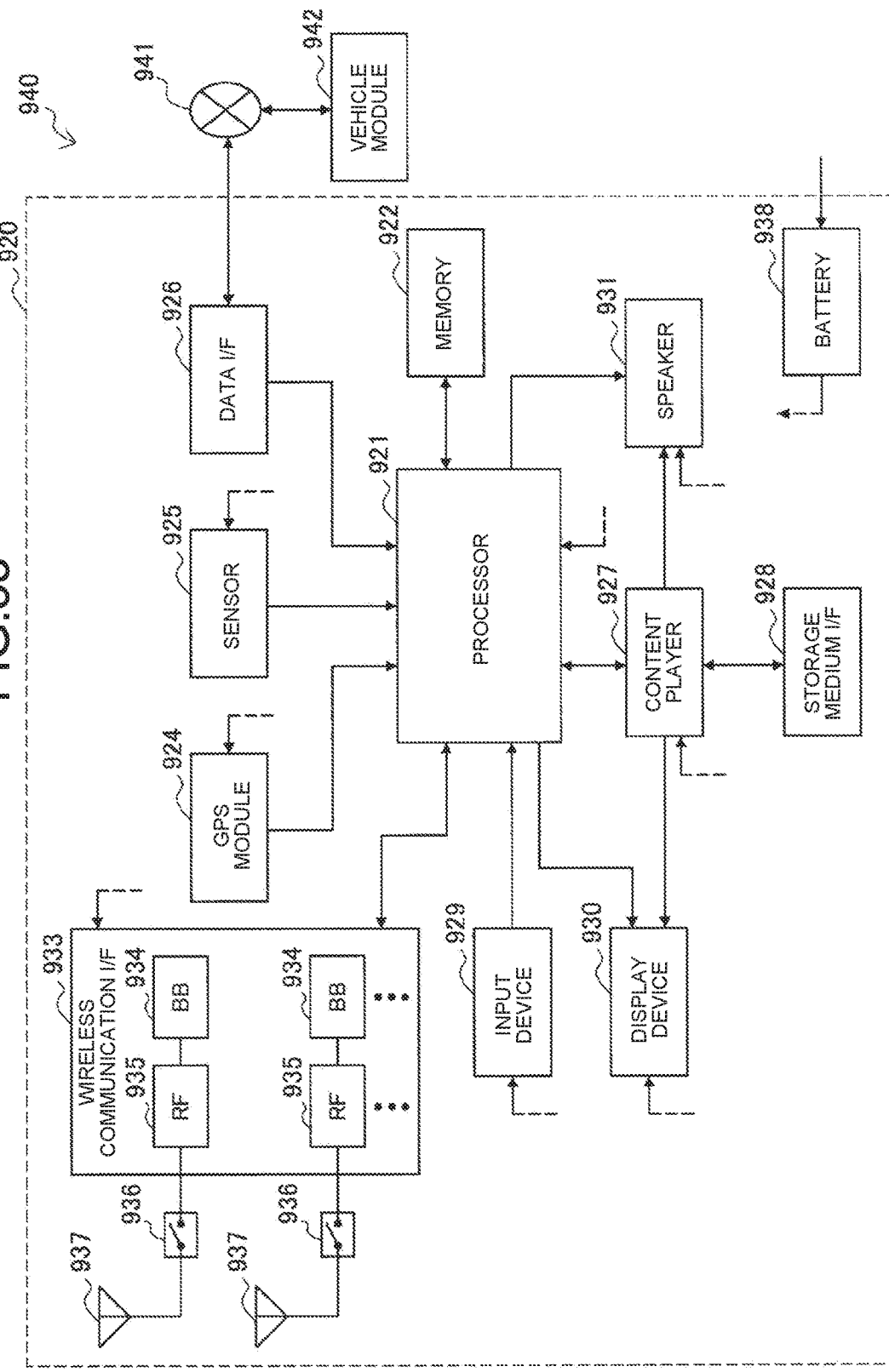

WIRELESS COMMUNICATION DEVICE AND WIRELESS COMMUNICATION METHOD

CROSS REFERENCE TO RELATED APPLICATIONS

This application is a U.S. National Phase of International Patent Application No. PCT/JP2018/047239 filed on Dec. 21, 2018, which claims priority benefit of Japanese Patent Application No. JP 2018-002806 filed in the Japan Patent Office on Jan. 11, 2018. Each of the above-referenced applications is hereby incorporated herein by reference in its entirety.

FIELD

The present disclosure relates to a wireless communication device, a wireless communication method, and a computer program.

BACKGROUND

Wireless access schemes and wireless networks of cellular mobile communication (hereinafter also referred to as long term evolution (LTE), LTE-advanced (LTE-A), LTE-advanced pro (LTE-A Pro), new radio (NR), new radio access technology (NRAT), evolved universal terrestrial radio access (EUTRA), or further EUTRA (FEUTRA)) are under review in 3rd generation partnership project (3GPP). Incidentally, in the following description, LTE includes LTE-A, LTE-A Pro, and EUTRA, and NR includes fifth-generation mobile wireless communication (5G), NRAT, and FEUTRA. In LTE and NR, a base station device (base station) is also referred to as evolved NodeB (eNodeB) or gnodeB (gNB), and a terminal device (a mobile station, a mobile station device, and a terminal) is also referred to as user equipment (UE). LTE and NR are cellular communication systems in which a plurality of areas covered by base station devices is arranged in a cell shape. A single base station device may manage a plurality of cells.

NR is a different radio access technology (RAT) from LTE as a wireless access scheme of the next generation of LTE. NR is an access technology that can support various use cases including enhanced mobile broadband (eMBB), massive machine type communications (mMTC), and ultra reliable and low latency communications (URLLC). NR is examined for a technical framework that addresses usage scenarios, requirements, and deployment scenarios in those use cases. One of the technologies under examination in NR is non-orthogonal multiple access (NOMA). This is a technique for improving frequency use efficiency by using non-orthogonal resources in addition to orthogonal resources, and details are disclosed in Non Patent Literatures 1 and 2. Further, for example, there is a Pre-emption technology which uses a part of eMBB resources as URLLC resources. With the Pre-emption technology, it is possible to transmit more urgent data with lower delay. Details of the Pre-emption technology are disclosed in Non Patent Literature 3.

CITATION LIST

Non Patent Literature

Non Patent Literature 1: 3GPP, RAN1, TR36.859, "Study on Downlink Multiuser Superposition Transmission (MUST)", January, 2016.

Non Patent Literature 2: 3GPP, RAN1, R1-1610076, NTT DOCOMO, Inc., "Discussion on multiple access for eMBB", October, 2016.

Non Patent Literature 3: 3GPP, RAN1, R1-1720463, Sony, "Remaining issues in Pre-emption Indicator", December, 2017.

SUMMARY

Technical Problem

As described above, in NR, realization of communication having higher frequency use efficiency than LTE is required to cope with various use cases.

Therefore, the present disclosure proposes a new and improved wireless communication device, wireless communication method, and computer program capable of further improving transmission efficiency of the entire system.

Solution to Problem

According to the disclosure, A wireless communication device is provided that includes: a communication unit configured to transmit and receive a signal by wireless communication; and a control unit configured to control use of a resource used for the wireless communication by the communication unit, wherein a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and the control unit controls whether the first channel in the resource used to transmit the another signal is used exclusively or used using by non-orthogonal multiplexing.

Moreover, according to the disclosure, a wireless communication method, by a processor, the method is provided that includes: transmitting and receiving a signal by wireless communication; and controlling use of a resource used for the wireless communication by the communication unit, wherein a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and in a control of use of the resource, the control is performed about whether the first channel in the resource used to transmit the another signal is used exclusively or used using by non-orthogonal multiplexing.

Moreover, according to the disclosure, a computer program is provided that causes a computer to perform: transmitting and receiving a signal by wireless communication; and controlling use of a resource used for the wireless communication by the communication unit, wherein a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and in a control of use of the resource, the control is performed about whether the first channel in the resource used to transmit the another signal is used exclusively or used using by non-orthogonal multiplexing.

Advantageous Effects of Invention

As described above, according to the present disclosure, it is possible to provide a new and improved wireless communication device, wireless communication method, and computer program capable of further improving the transmission efficiency of the entire system.

Incidentally, the above effects are not necessarily limited, and any of the effects described in this specification or other effects that can be grasped from this specification may be exerted together with or in place of the above effects.

BRIEF DESCRIPTION OF DRAWINGS

FIG. 3 is a diagram illustrating an example of a parameter set related to a transmission signal in an NR cell.

FIG. 22A is an explanatory diagram illustrating still another operation of the base station device and the terminal devices in a sequence diagram.

FIG. 33 is a block diagram illustrating an example of a schematic configuration of a car navigation device to which the technology according to the present disclosure can be applied.

DESCRIPTION OF EMBODIMENTS

Figure 1:
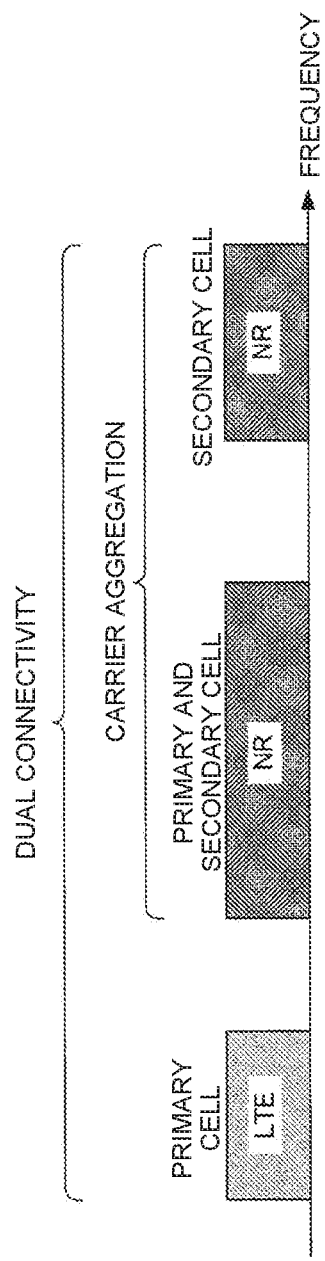
FIG. 1 is a diagram illustrating an example of setting a component carrier in this embodiment.

Hereinafter, preferred embodiments of the present disclosure will be described in detail with reference to the accompanying drawings. In addition, in this specification and drawing, constituent elements having substantially the same functional configuration are denoted by the same reference numerals, and redundant description is omitted.

The description will be made in the following order.
1. Embodiment of the present disclosure
2. Application example
3. Conclusion

1. EMBODIMENT OF THE PRESENT DISCLOSURE

Wireless Communication System in this Embodiment

In this embodiment, a wireless communication system includes at least a base station device 1 and a terminal device 2. The base station device 1 can accommodate a plurality of terminal devices. The base station device 1 can be connected to another base station device by a unit of an X2 interface. Further, the base station device 1 can be connected to an evolved packet core (EPC) by a unit of an S1 interface. Furthermore, the base station device 1 can be connected to a mobility management entity (MME) by a unit of an S1-MME interface, and can be connected to a serving gateway (S-GW) by a unit of an S1-U interface. The S1 interface supports many-to-many connection between the MME and/or the S-GW and the base station device 1. Further, in this embodiment, the base station device 1 and the terminal device 2 support LTE and/or NR, respectively.

Radio Access Technology in this Embodiment

In this embodiment, each of the base station device 1 and the terminal device 2 supports one or more radio access technologies (RATs). For example, the RAT includes LTE and NR. One RAT corresponds to one cell (component carrier). That is, when a plurality of RATs is supported, those RATs correspond to different cells, respectively. In this embodiment, a cell is a combination of a downlink resource, an uplink resource, and/or a sidelink. In the following description, the cell corresponding to LTE is called an LTE cell, and the cell corresponding to NR is called an NR cell.

Downlink communication is communication from the base station device 1 to the terminal device 2. Uplink communication is communication from the terminal device 2 to the base station device 1. Sidelink communication is communication from the terminal device 2 to another terminal device 2.

The sidelink communication is defined for contiguous direct detection and contiguous direct communication between terminal devices. The sidelink communication can use a frame configuration similar to that of the uplink and downlink. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to this embodiment. In the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
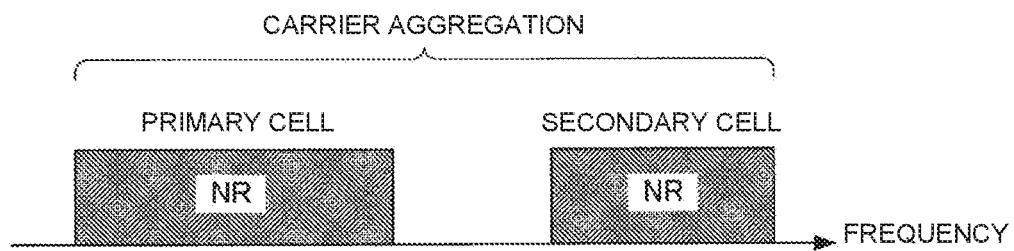
FIG. 2 is a diagram illustrating an example of setting a component carrier in this embodiment.

FIG. 2 is a diagram illustrating an example of setting of a component carrier according to this embodiment. In the example of FIG. 2, two NR cells are set. The two NR cells are set as a primary cell and a secondary cell, respectively, and are integrated by carrier aggregation. In this case, when the NR cell supports the function of performing standalone communication, the assist of the LTE cell is not necessary. Note that the two NR cells may be integrated by the dual connectivity.

Frame Configuration of NR in this Embodiment

In each NR cell, one or more predetermined parameters are used in a certain predetermined time length (for example, a sub frame). That is, in the NR cell, a downlink signal and an uplink signal are each generated using one or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with one or more predetermined parameters in a predetermined time length. In a case where the plurality of predetermined parameters is used, a signal generated using the predetermined parameters is multiplexed in accordance with a predetermined method. For example, the predetermined method includes frequency division multiplexing (FDM), time division multiplexing (TDM), code division multiplexing (CDM), and/or spatial division multiplexing (SDM).

In a combination of the predetermined parameters set in the NR cell, a plurality of kinds of parameter sets can be specified in advance.

FIG. 3 is a diagram illustrating examples of the parameter sets related to a transmission signal in the NR cell. In the example of FIG. 3, parameters of the transmission signal included in the parameter sets include a sub frame interval, the number of sub carriers per resource block in the NR cell, the number of symbols per sub frame, and a CP length type. The CP length type is a type of CP length used in the NR cell. For example, CP length type 1 is equivalent to a normal CP in LTE, and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 4:
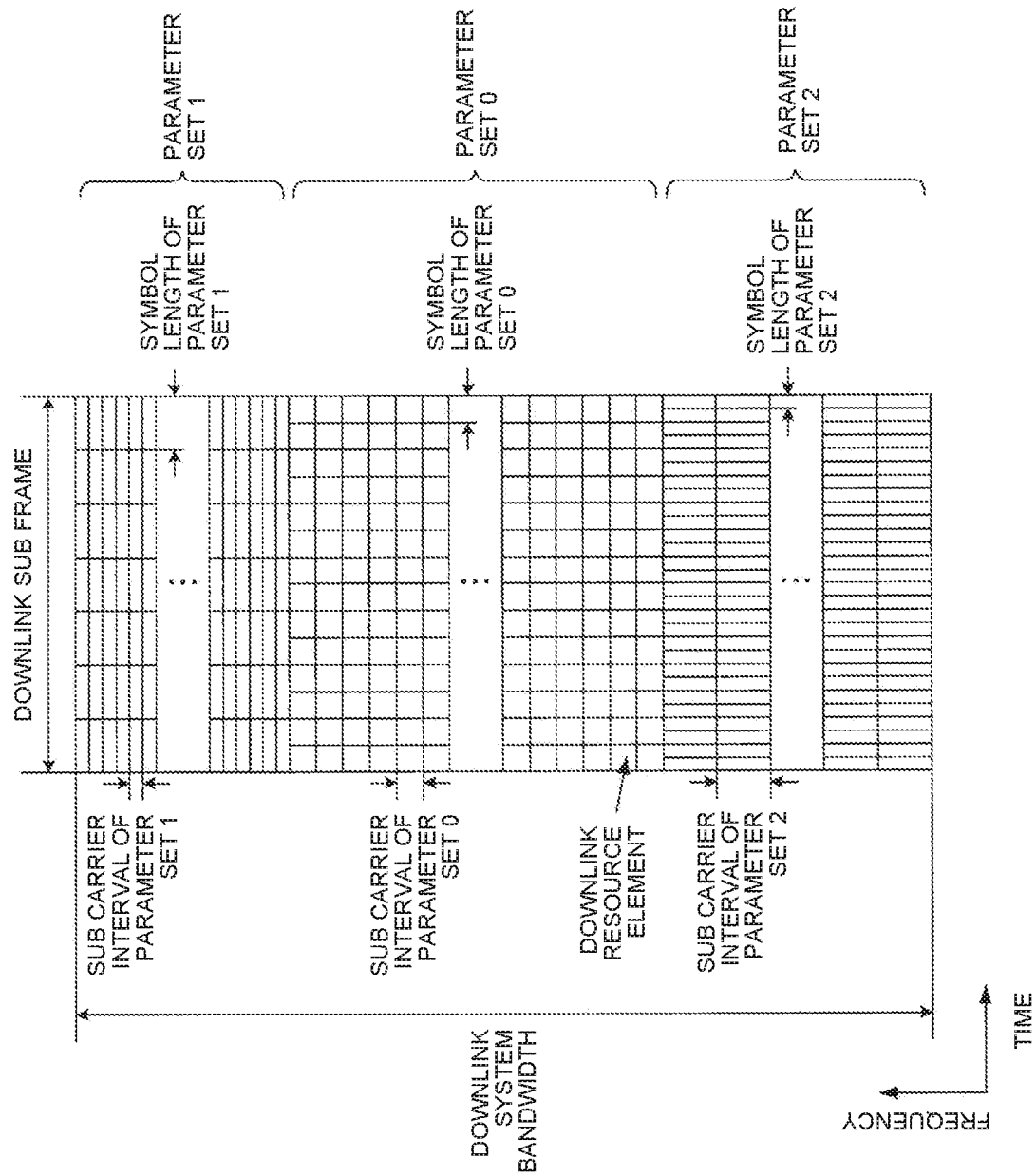
FIG. 4 is a diagram illustrating an example of an NR downlink sub frame according to this embodiment.

FIG. 4 is a diagram illustrating an example of an NR downlink sub frame according to this embodiment. In the example of FIG. 4, signals generated using parameter set 1, parameter set 0, and parameter set 2 are subjected to FDM in a cell (system bandwidth). The diagram illustrated in FIG. 4 is also referred to as a downlink resource grid of NR. The base station device 1 can transmit a physical downlink channel of NR and/or a physical downlink signal of NR in a downlink sub frame to the terminal device 2. The terminal device 2 can receive the physical downlink channel of NR and/or the physical downlink signal of NR in the downlink sub frame from the base station device 1.

Figure 5:
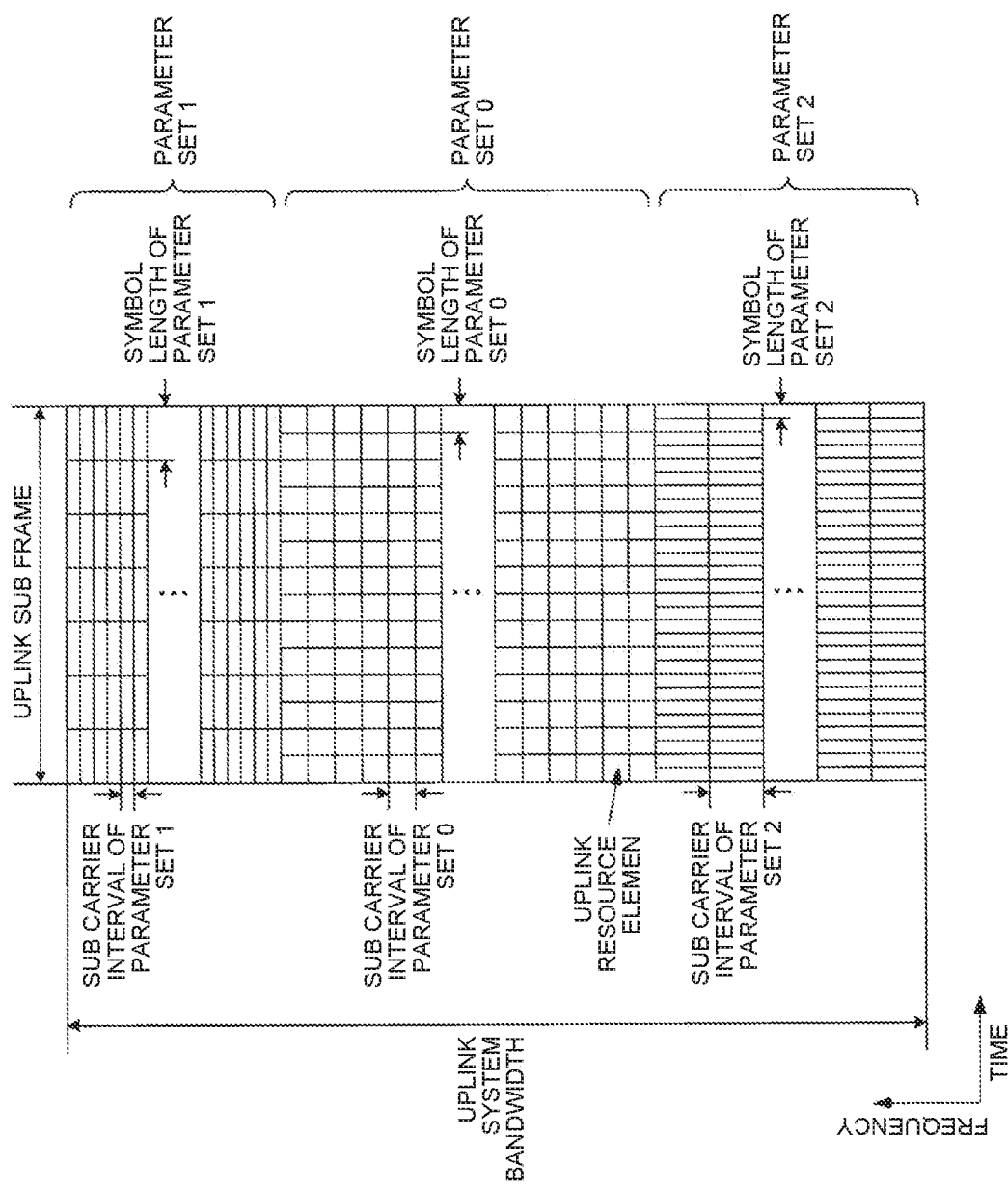
FIG. 5 is a diagram illustrating an example of an NR uplink sub frame according to this embodiment.

FIG. 5 is a diagram illustrating an example of an NR uplink sub frame according to this embodiment. In the example of FIG. 5, signals generated using parameter set 1, parameter set 0, and parameter set 2 are subjected to FDM in a cell (system bandwidth). The diagram illustrated in FIG. 5 is also referred to as an uplink resource grid of NR. The base station device 1 can transmit a physical uplink channel of NR and/or a physical uplink signal of NR in an uplink sub frame to the terminal device 2. The terminal device 2 can receive the physical uplink channel of NR and/or the physical uplink signal of NR in the uplink sub frame from the base station device 1.

Configuration Example of Base Station Device 1 in this Embodiment

Figure 6:
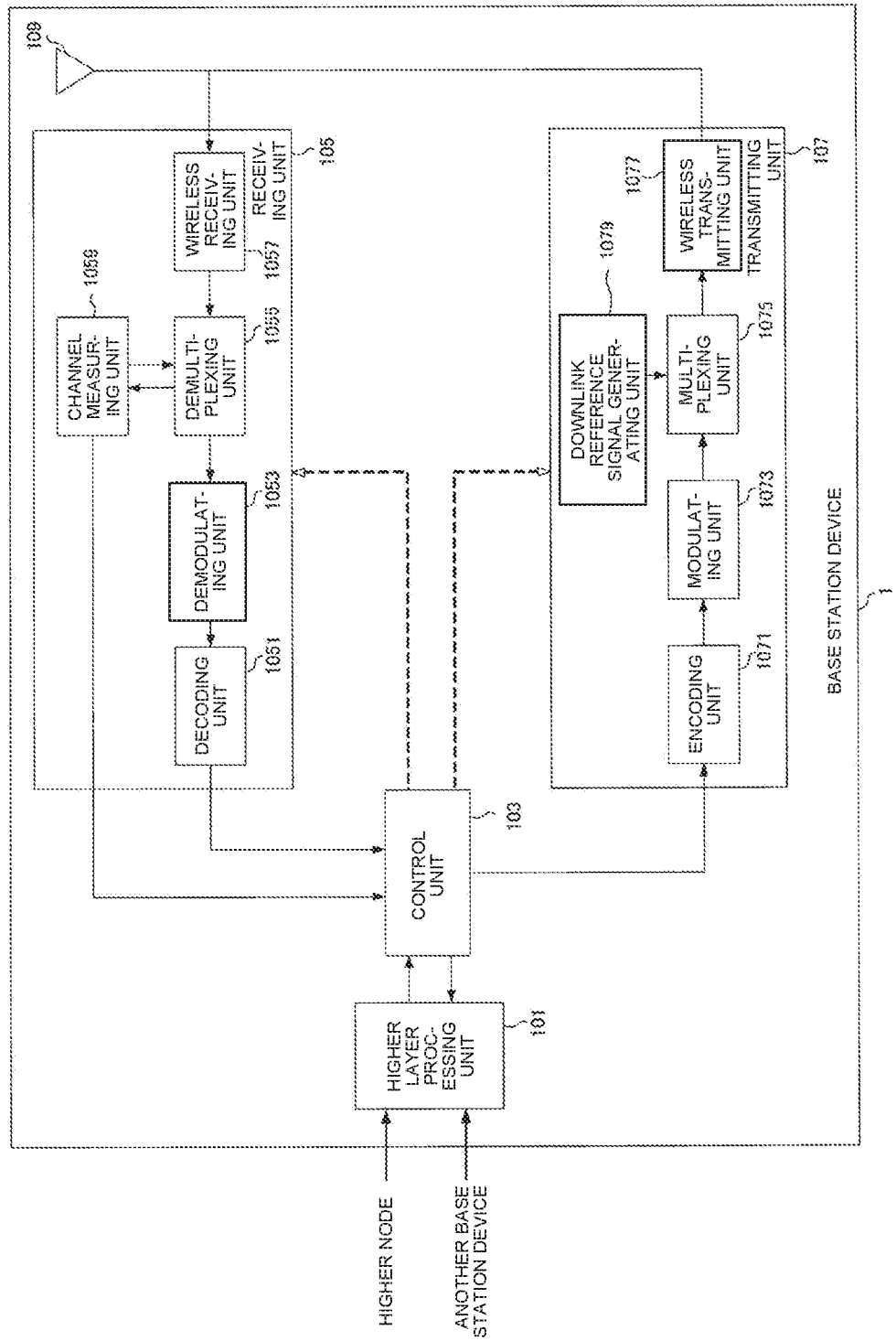
FIG. 6 is a schematic block diagram illustrating a configuration of a base station device 1 of this embodiment.

FIG. 6 is a schematic block diagram illustrating a configuration of the base station device 1 of this embodiment.

As illustrated in the drawing, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 6 can be configured individually in accordance with the RAT. For example, the receiving unit 105 and the transmitting unit 107 are configured individually in LTE and NR. Further, in the NR cell, some or all of the units included in the base station device 1 illustrated in FIG. 6 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Incidentally, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value and a channel quality of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Incidentally, the reception process in the receiving unit 105 is performed on the basis of a setting which is specified in advance or a setting of which the base station device 1 notifies the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates an uplink channel such as a PUCCH or a PUSCH and/or an uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulated symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures an estimation value, a channel quality, and/or the like of the propagation path from the uplink reference signal input from the demultiplexing unit 1055, and outputs the estimation value, the channel quality, and/or the like of the propagation path to the demultiplexing unit 1055 and/or the control unit 103. For example, the estimation value of the propagation path for propagation path compensation for the PUCCH or the PUSCH is measured using an UL-DMRS, and the uplink channel quality is measured using an SRS.

The transmitting unit 107 performs a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and a downlink reference signal and generates a transmission signal. Note that the transmission process in the transmitting unit 107 is performed on the basis of a setting which is specified in advance, a setting of which the base station device 1 notifies the terminal device 2, or a setting given in notification through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, or turbo coding. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of physical cell identification (PCI), an RRC parameter set in the terminal device 2, and the like. The multiplexing unit 1075 multiplexes the modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion into an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

Configuration Example of Terminal Device 2 in this Embodiment

Figure 7:
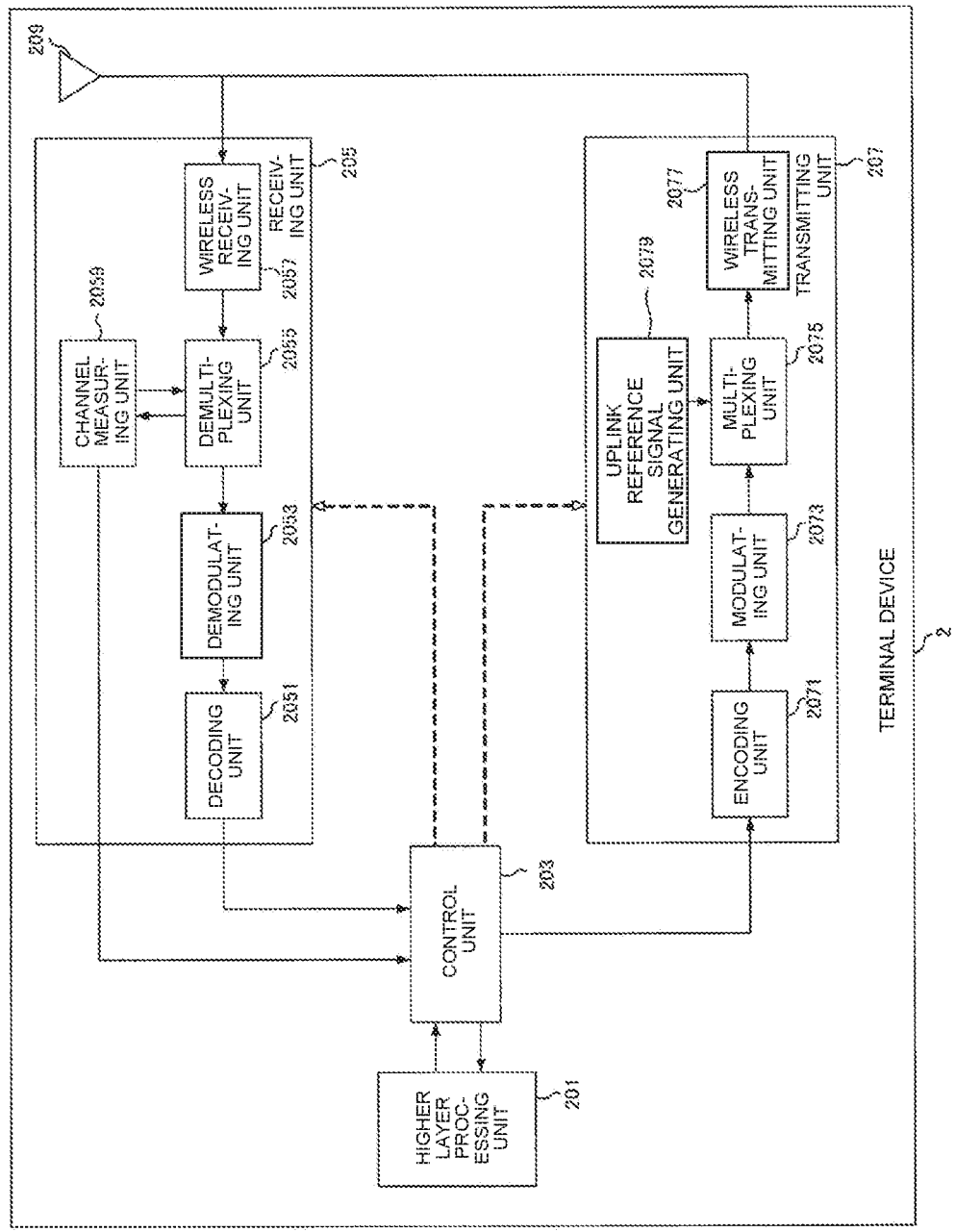
FIG. 7 is a schematic block diagram illustrating a configuration of a terminal device 2 of this embodiment.

FIG. 7 is a schematic block diagram illustrating a configuration of the terminal device 2 of this embodiment. As illustrated in the drawing, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 7 can be configured individually in accordance with the RAT. For example, the receiving unit 205 and the transmitting unit 207 are configured individually in LTE and NR. Further, in the NR cell, some or all of the units included in the terminal device 2 illustrated in FIG. 7 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on the control information set or given in notification from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Incidentally, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Note that the reception process in the receiving unit 205 is performed on the basis of a setting which is specified in advance or the notification or the setting from the base station device 1.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the downlink reference signal to the channel measuring unit 2059. The demultiplexing unit 2055 compensates the propagation path for the downlink channel from the estimation value of the propagation path input from the channel measuring unit 2059.

The demodulating unit 2053 demodulates the reception signal for the modulated symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures an estimation value, a channel quality, and/or the like of the propagation path from the downlink reference signal input from the demultiplexing unit 2055, and outputs the estimation value, the channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through a CRS. The downlink channel for reporting the CSI is measured through a CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Incidentally, the transmission process in the transmitting unit 207 is performed on the basis of a setting which is specified in advance or a setting or notification from the base station device 1.

The encoding unit 2071 encodes the HARQ indicator (HARQ-ACK), the uplink control information, and the uplink data input from the control unit 203 using a predetermined coding scheme such as block coding, convolutional coding, or turbo coding. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes the modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion into an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

Signaling of Control Information in this Embodiment

The base station device 1 and the terminal device 2 can use various methods for signaling (notification, broadcasting, or setting) of the control information. The signaling of the control information can be performed in various layers (layers). The signaling of the control information includes physical-layer signaling which is signaling performed through a physical layer, RRC signaling which is signaling performed through the RRC layer, and MAC signaling which is signaling performed through the MAC layer. The RRC signaling is dedicated RRC signaling for providing notification of specific control information to the terminal device 2 or common RRC signaling for providing notification of specific control information to the base station device 1. Signaling used by a higher layer when viewed from the physical layer, such as RRC signaling and MAC signaling, is also referred to as higher-layer signaling.

The RRC signaling is implemented by signaling the RRC parameter. The MAC signaling is implemented by signaling the MAC control element. The physical-layer signaling is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The physical-layer signaling is used for signaling dynamic control information and is also referred to as dynamic signaling. The DCI is used for scheduling of the PDSCH or scheduling of the PUSCH. The UCI is used for the CSI report, the HARQ-ACK report, and/or the scheduling request (SR).

Signaling of Control Information in this Embodiment

The base station device 1 and the terminal device 2 can use various methods for signaling (notification, broadcasting, or setting) of the control information. The signaling of the control information can be performed in various layers (layers). The signaling of the control information includes physical-layer signaling which is signaling performed through a physical layer, RRC signaling which is signaling performed through the RRC layer, and MAC signaling which is signaling performed through the MAC layer. The RRC signaling is dedicated RRC signaling for providing notification of specific control information to the terminal device 2 or common RRC signaling for providing notification of specific control information to the base station device 1. Signaling used by a higher layer when viewed from the physical layer, such as RRC signaling and MAC signaling, is also referred to as higher-layer signaling.

The RRC signaling is implemented by signaling the RRC parameter. The MAC signaling is implemented by signaling the MAC control element. The physical-layer signaling is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The physical-layer signaling is used for signaling dynamic control information and is also referred to as dynamic signaling. The DCI is used for scheduling of the PDSCH or scheduling of the PUSCH. The UCI is used for the CSI report, the HARQ-ACK report, and/or the scheduling request (SR).

Details of Downlink Control Information in this Embodiment

The DCI is given in notification using the DCI format having a field which is specified in advance. Predetermined information bits are mapped to the field specified in the DCI format. The DCI provides notification of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for providing notification of the DCI to the terminal device 2 is disposed is not given in notification, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC (CRC parity bit) is scrambled using a radio network temporary identifier (RNTI). The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), and an eIMTA-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel with a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel with a CRC scrambled using the TPC-PUCCH-RNTI is used for power control of the PUCCH. A control channel with a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with a CRC scrambled using the M-RNTI is used for scheduling the MBMS. A control channel with a CRC scrambled using the eIMTA-RNTI is used for providing notification of information related to a TDD UL/DL setting of a TDD serving cell in dynamic TDD (eIMTA). Incidentally, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency domain. The resource block group is successive resource block sets and indicates resources allocated to the scheduled terminal device. A size of the resource block group is decided in accordance with a system bandwidth.

Details of Downlink Control Channel in this Embodiment

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and the control channel specific to the terminal device 2 can be transmitted individually. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using a set of one or more control channel elements (CCE). The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using a set of one or more enhanced control channel elements (ECCE). The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the numbers of PDCCH candidates in the aggregation levels 4 and 8 are 4 and 2, respectively. For example, in the USS, the numbers of PDCCH candidates in the aggregations 1, 2, 4, and 8 are 6, 6, 2, and 2, respectively.

Each ECCE includes a plurality of enhanced resource element groups (EREG). The EREG is used to define mapping to the resource element of the EPDCCH. Sixteen EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be configured by a predetermined number of RB pairs. Each EPDCCH configures one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set configures ECCEs 0 to N−1. For example, in a case in which the number of EREGs used in one ECCE is four, the EPDCCH set configured by four RB pairs configures sixteen ECCEs.

<Pre-Emption>

Figure 8:
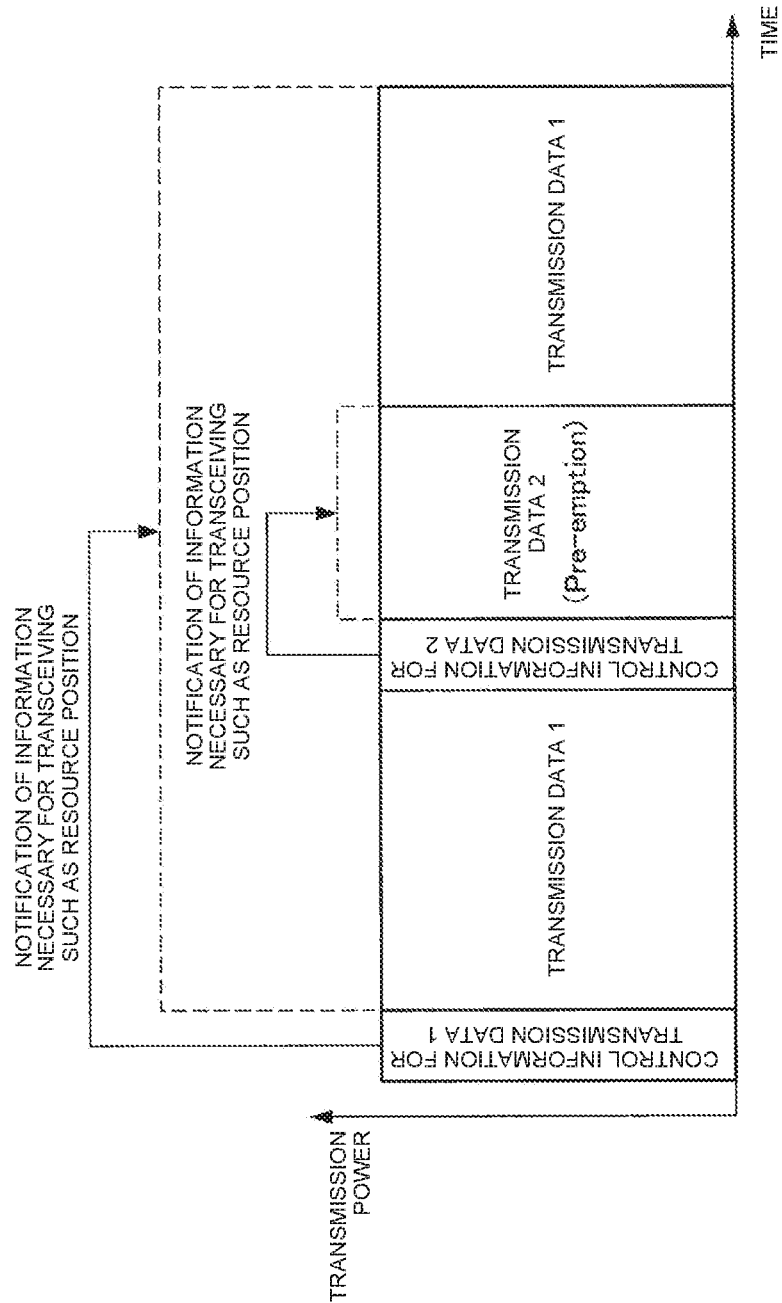
FIG. 8 is an explanatory diagram illustrating an example in which a part of a transmission resource of transmission data is transmitted by Pre-emption of other transmission data.

Pre-emption is to transmit a part of a transmission resource of certain transmission data to be used as a transmission resource of another transmission data. The transmission resource may be a frequency resource or a time resource. The Pre-emption may be performed not only in the downlink direction but also in the uplink direction. FIG. 8 illustrates an example in which the transmission data 2 transmits a part of the transmission resource of the transmission data 1 by Pre-emption. The control information for transmission data 1 illustrated in FIG. 8 provides notification of a resource position for transmitting transmission data 1 that follows. At this time, it is assumed that the transmission data 2 is necessarily transmitted, for example, for transmitting emergency data. For example, when there is no other transmission resource that can be allocated, the transmission data 2 is transmitted using a part of the resource of the transmission data 1. At this time, control information for transmission data 2 illustrated in FIG. 8 is transmitted, and the resource given in notification through the control information for transmission data 2 is used to the transmit transmission data 2.

For example, it is assumed that the transmission data 1 is data destined for the terminal device 1 and the transmission data 2 is data destined for the terminal device 2. When transmitting with Pre-emption, a part of the data of the transmission data 1 is lost, and the transmission data 2 is transmitted instead. Therefore, a problem may occur in decoding of the terminal device 1. In order to attempt to decode all the signals of the resource given in notification through the control information for transmission data 1, the terminal device 1 decodes the transmission data 1 including the control information for transmission data 2 and the transmission data 2 included in the resource. Even when decoding is performed in a state where the control information for transmission data 2 and the transmission data 2 are included, decoding may be successful due to error correction. However, since the control information for transmission data 2 and the transmission data 2 are equivalent to noise for the terminal device 1, the characteristics are improved when decoding is performed without including the control information for transmission data 2 and the transmission data 2.

Figure 9:
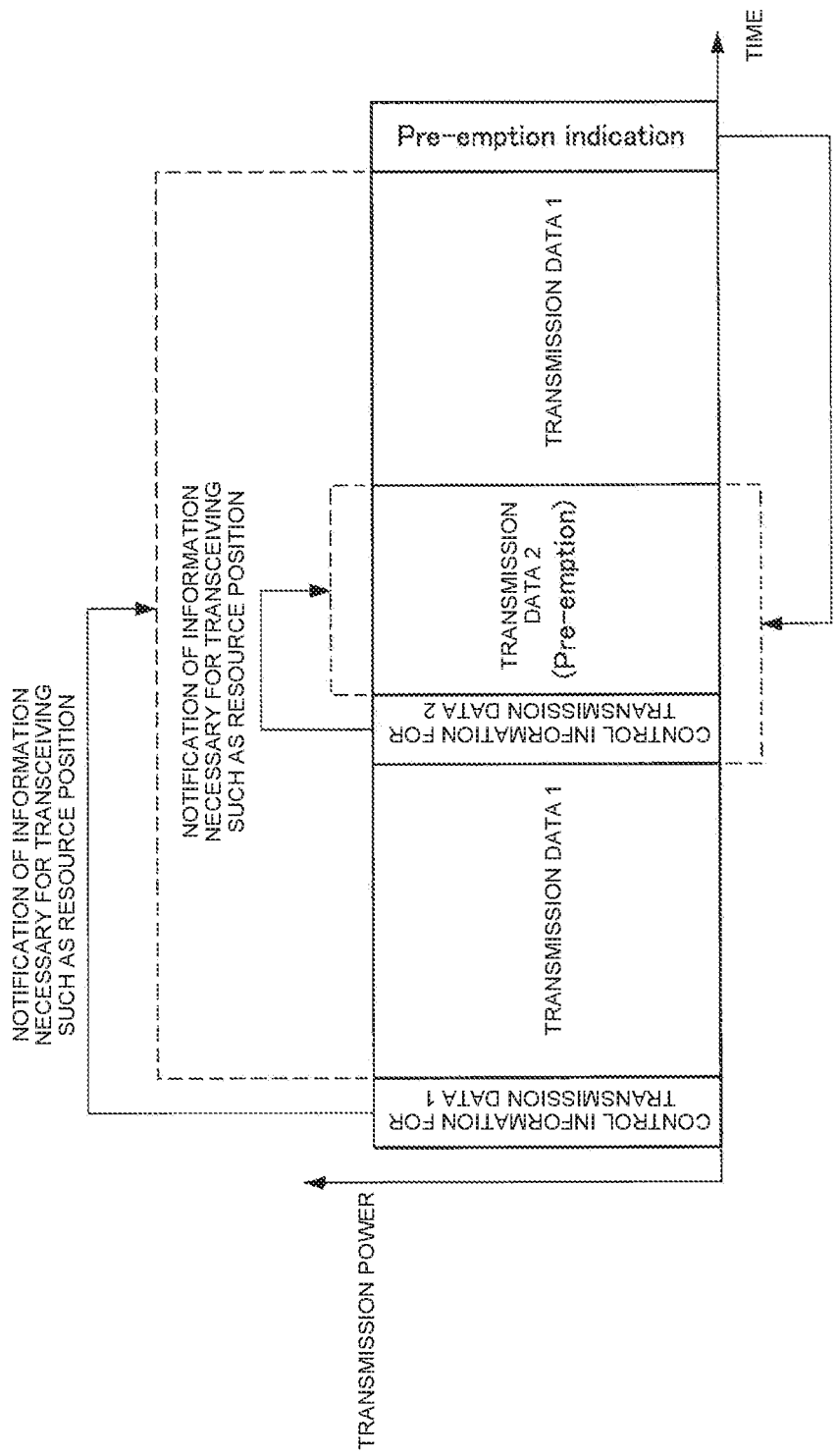
FIG. 9 is an explanatory diagram illustrating that a Pre-emption indication is included in a resource.
Figure 10:
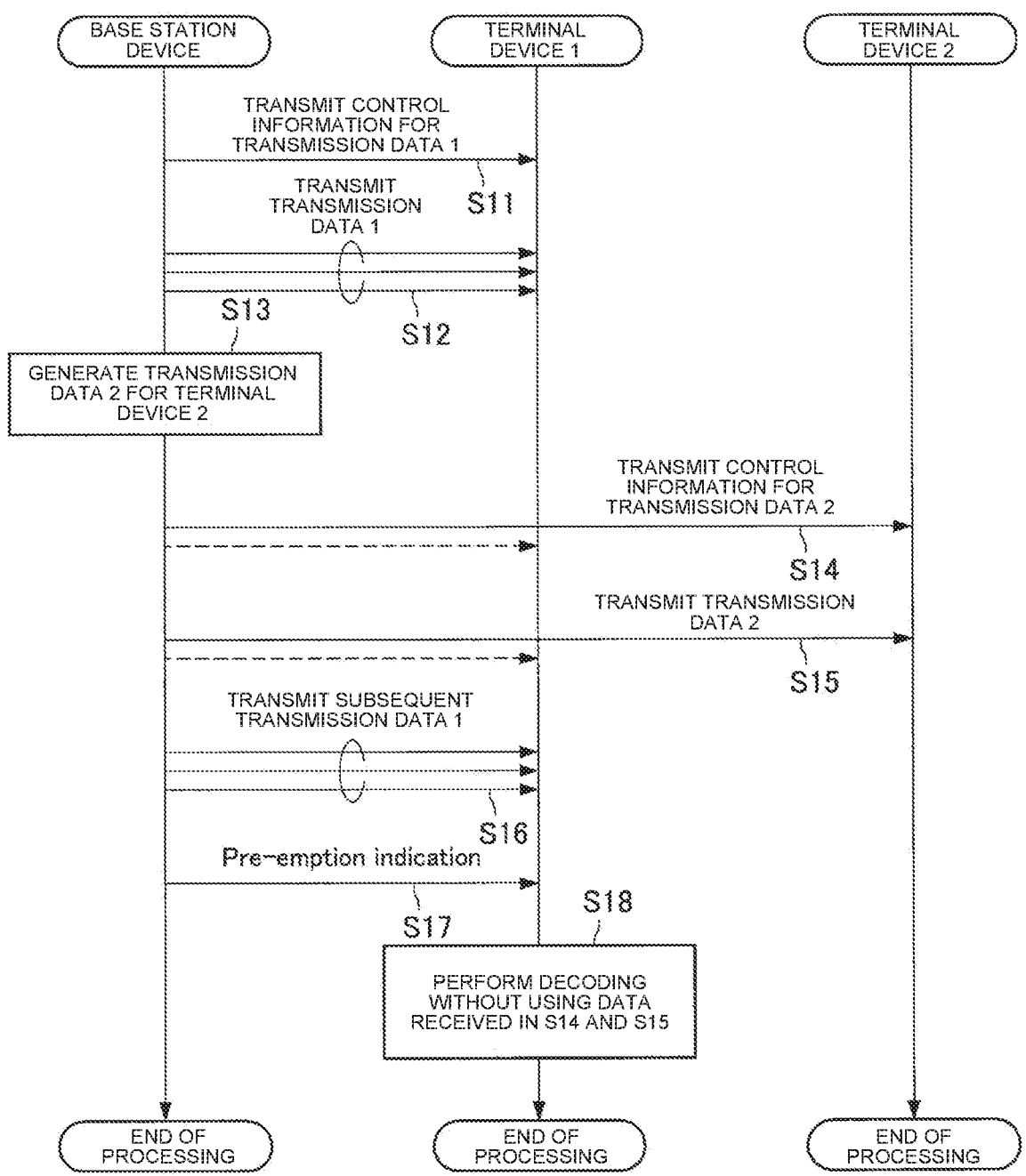
FIG. 10 is an explanatory diagram illustrating operations of the base station device and the terminal devices 1 and 2 in a sequence diagram.

Therefore, there is a method of improving characteristics by providing notification of the Pre-emption resource. For example, this notification is referred to as a Pre-emption indication. As one example, at a timing after the Pre-emption resource, the base station device notifies the terminal device 1 that the Pre-emption has been performed. This example is illustrated in FIGS. 9 and 10. FIG. 9 is an explanatory diagram illustrating that a Pre-emption indication is included in a resource. FIG. 10 is an explanatory diagram illustrating operations of the base station device and the terminal devices 1 and 2 in a sequence diagram.

First, the base station device transmits control information for transmission data 1 to the terminal device 1 in order to transmit data (transmission data 1) to the terminal device 1 (Step S11). Thereafter, the base station device transmits the transmission data 1 to the terminal device 1 (Step S12). When the transmission data 2 for the terminal device 2 is generated while the base station device is transmitting the transmission data 1 (Step S13), the base station device temporarily stops transmission of the transmission data 1, and the control information for transmission data 2 is transmitted to the terminal device 2 in order to transmit data (transmission data 2) to the terminal device 2 (Step S14). Thereafter, the base station device transmits the transmission data 2 to the terminal device 2 (Step S15). The data transmitted by the base station device in Steps S14 and S15 can be received not only by the terminal device 2 but also by the terminal device 1. A broken line in FIG. 10 indicates that the terminal device 1 also can receive the data transmitted by the base station device in Steps S14 and S15.

When the transmission of the transmission data 2 is completed, the base station device restarts the transmission of the transmission data 1 (Step S16). When the transmission of the transmission data 1 is completed, the base station device transmits a Pre-emption indication to the terminal device 1 (Step S18). When receiving the Pre-emption indication, the terminal device 1 recognizes that this data is transmitted by the Pre-emption resource, and therefore performs decoding without using the data received in Steps S14 and S15 (Step S18).

When the Pre-emption indication is given in notification, the terminal device 1 does not use the signal of the resource indicated by the notification as decoded data, but replaces the signal with, for example, zero data to attempt decoding. As a result, the control information for transmission data 2 and the transmission data 2 which become noise can be replaced with zero, so that an improvement in decoding characteristics can be expected.

<Non-Orthogonal Multiple Access (NOMA)>

In orthogonal multiple access (OMA) transmission, for example, transmission and reception are performed using a frequency axis and a time axis which are orthogonal. At this time, the frame configuration of the frequency and time resources is determined by a sub carrier interval, and it is difficult to use resources equal to or more than the number of resource elements. On the other hand, in NOMA transmission, a frame configuration is determined by adding a non-orthogonal axis in addition to the orthogonal frequency axis and time axis. Note that examples of non-orthogonal axes include an Interleave pattern axis, a Spreading Pattern axis, a Scrambling Pattern axis, a Codebook axis, and a Power axis.

Figure 11:
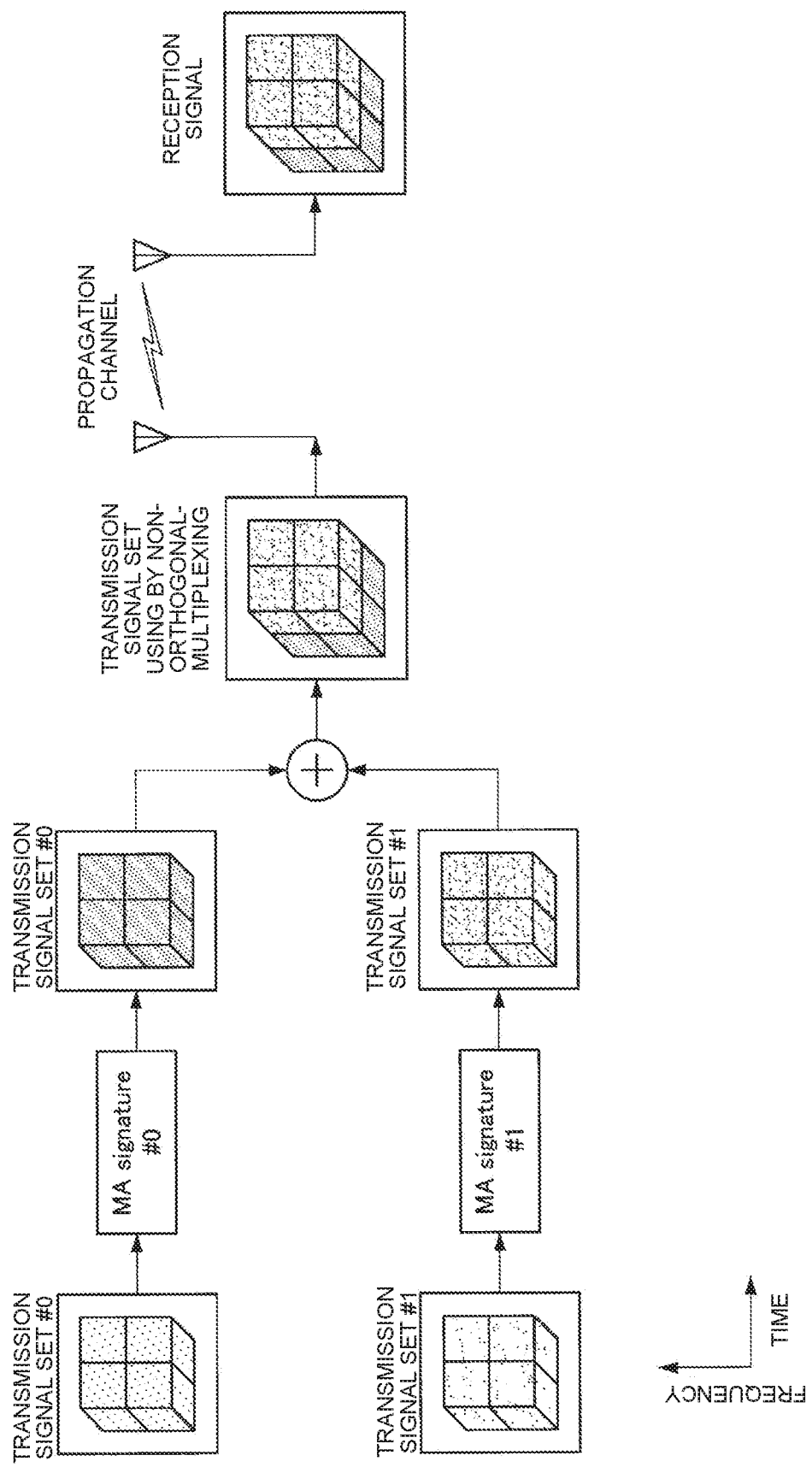
FIG. 11 is an explanatory diagram for describing an outline of an example of NOMA transmission.

For example, FIG. 11 is an explanatory diagram for describing an outline of an example of NOMA transmission and illustrates a case where a transmission signal is multiplexed on non-orthogonal axes in a transmission device, and the resources multiplexed on non-orthogonal axes are all the same parameter set. Here, the transmission device indicates either the base station device 1 or the terminal device 2. The transmission device prepares a plurality of multiplexed transmission signal sets. In FIG. 11, it is assumed that two transmission signal sets are multiplexed. Here, two transmission signal sets are used, but three or more transmission signal sets may be used. Further, each transmission signal set may be a transmission signal to a different reception device or a transmission signal to the same reception device. Here, the reception device indicates either the base station device 1 or the terminal device 2. A corresponding multiple access (MA) signature is applied to each transmission signal set. Here, the examples of the MA signature include Interleave pattern, Spreading Pattern, Scrambling Pattern, Codebook, Power Allocation, and Repetition. In addition, although it is referred to as MA signature here, it may be simply referred to as Pattern or Index. Examples include an identifier such as Pattern and Index used in NOMA transmission as described above and those representing Pattern itself. The signals after applying the MA signature are multiplexed on the same frequency and time resources and sent to the same antenna port.

Figure 12:
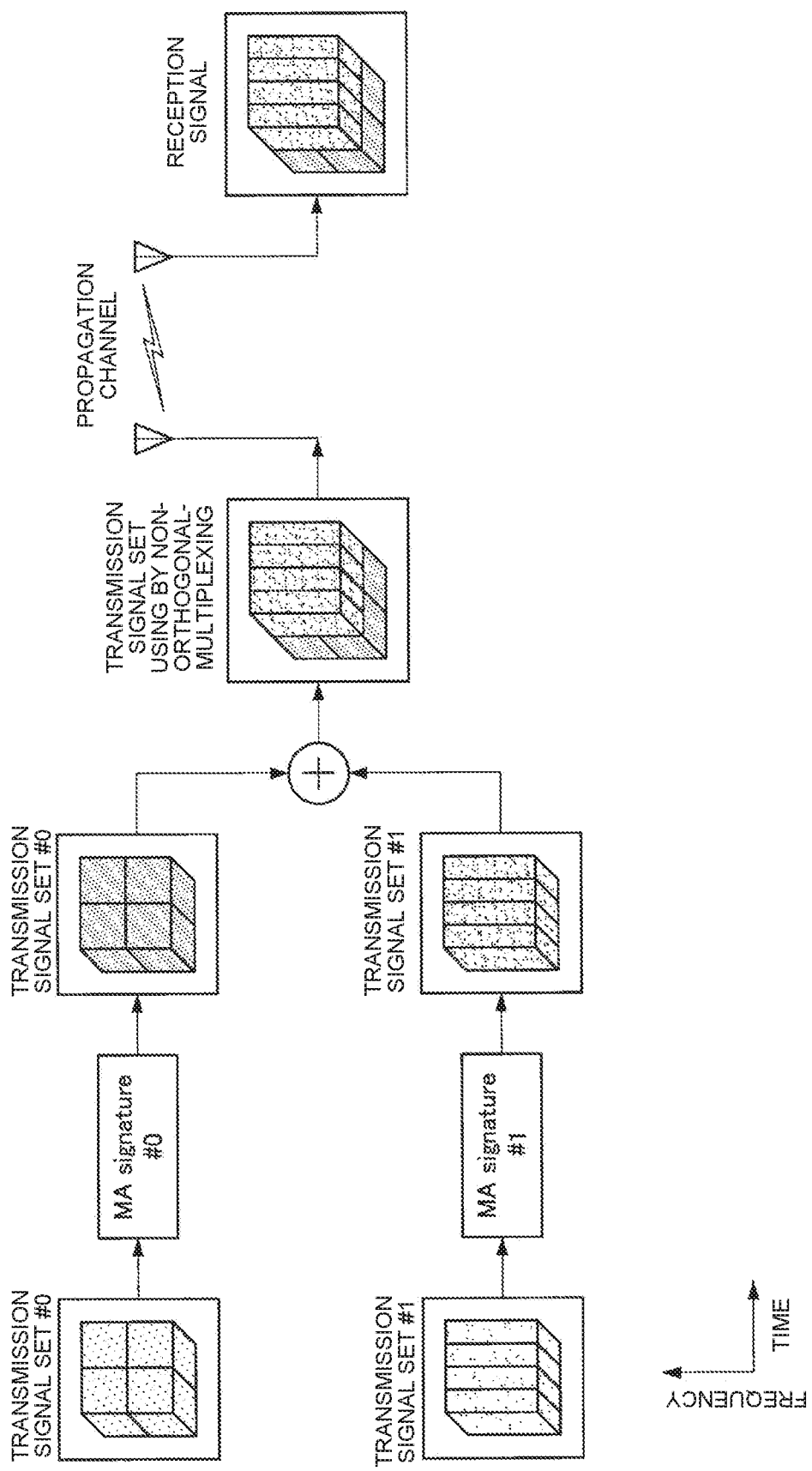
FIG. 12 is an explanatory diagram for describing an outline of another example of NOMA transmission.

In FIG. 11, the transmission signal sets of the same parameter set are multiplexed. However, as illustrated in FIG. 12, the transmission signal sets of different parameter sets may be multiplexed. FIG. 12 is an explanatory diagram for describing an outline of another example of NOMA transmission and is the same as FIG. 11 except that the transmission signal sets of different parameter sets are multiplexed.

Figure 13:
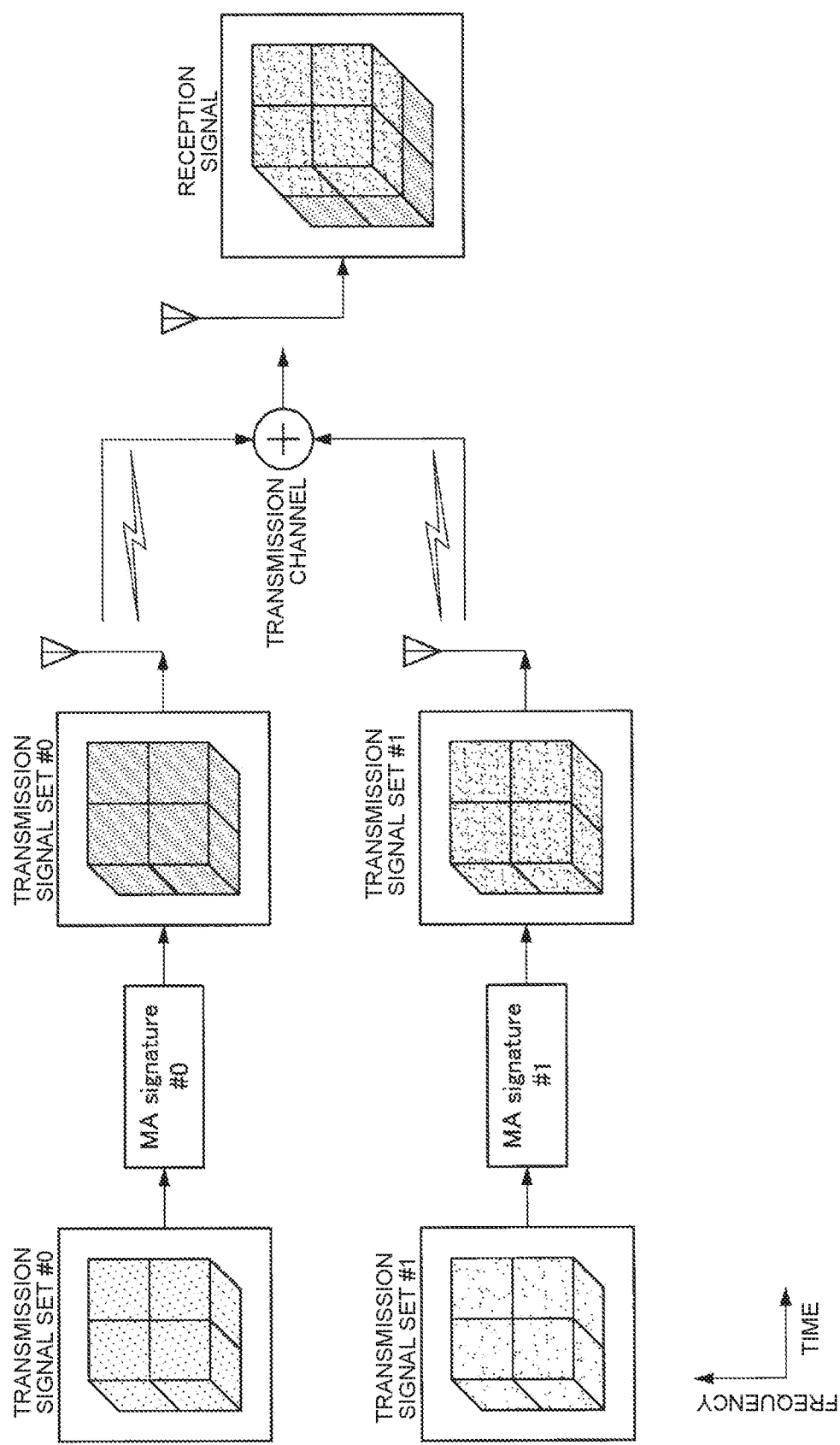
FIG. 13 is an explanatory diagram for describing an outline of still another example of NOMA transmission.
Figure 14:
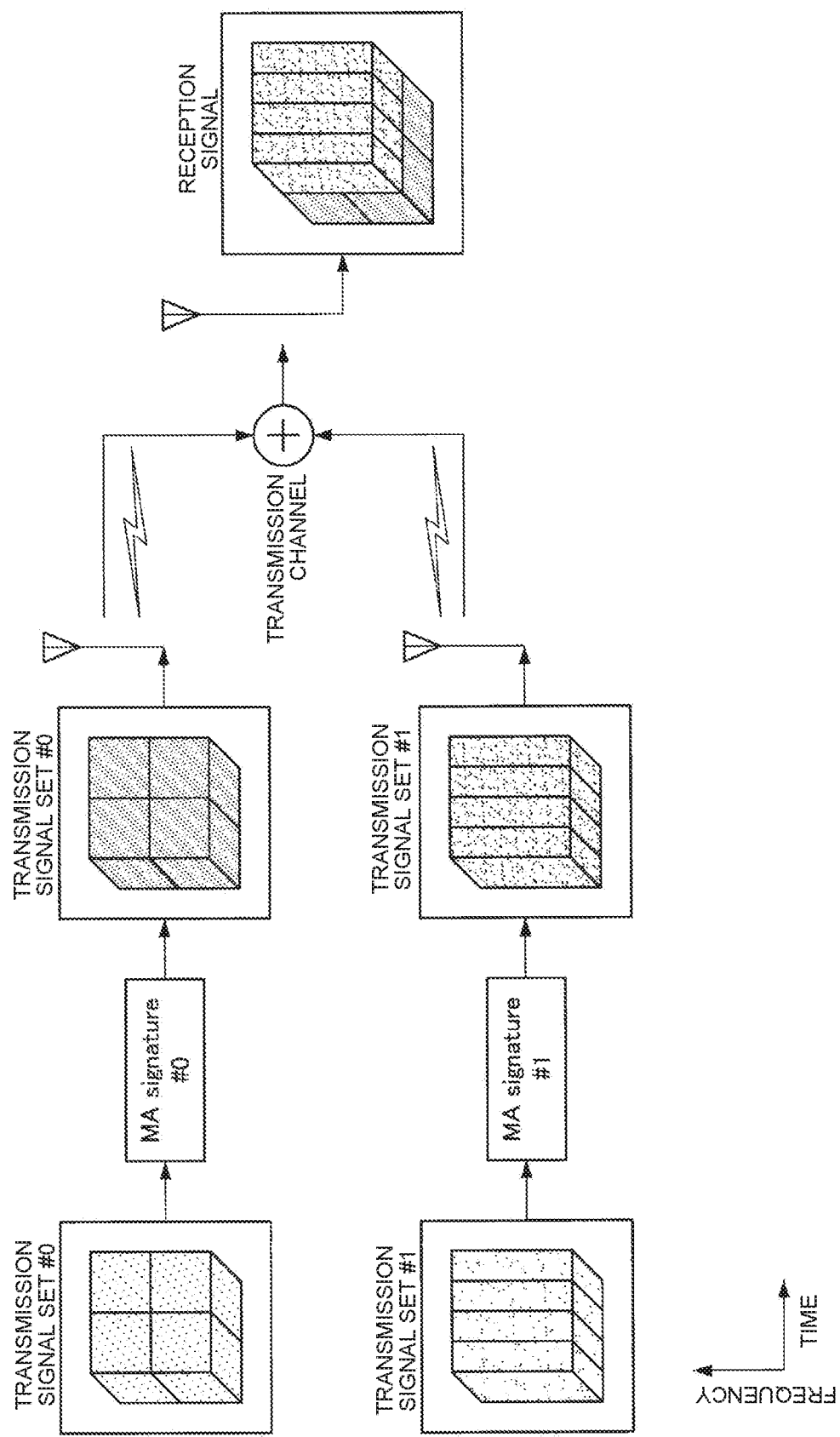
FIG. 14 is an explanatory diagram for describing an outline of still another example of NOMA transmission.

On the other hand, as illustrated in FIGS. 13 and 14, a method is also considered which transmits a signal to which the MA signature is applied without performing multiplexing in the transmission device so that non-orthogonal multiplexing is performed in the reception device. FIGS. 13 and 14 are explanatory diagrams for explaining outlines of other examples of NOMA transmission and illustrate examples in which multiplexing is not performed by the transmission device. In the examples illustrated in FIGS. 13 and 14, the corresponding MA signature is applied to each transmission signal set. Here, the examples of the MA signature include Interleave pattern, Spreading Pattern, Scrambling Pattern, Codebook, Power Allocation, and Repetition. The signal after applying the MA signature is transmitted on the same frequency and time resources and multiplexed through a propagation channel. In this case, each transmission signal set may be transmitted from a different transmission device. Further, as illustrated in FIG. 14, the parameter sets of transmission signals transmitted on the same frequency and time resources may be different parameter sets.

Figure 15:
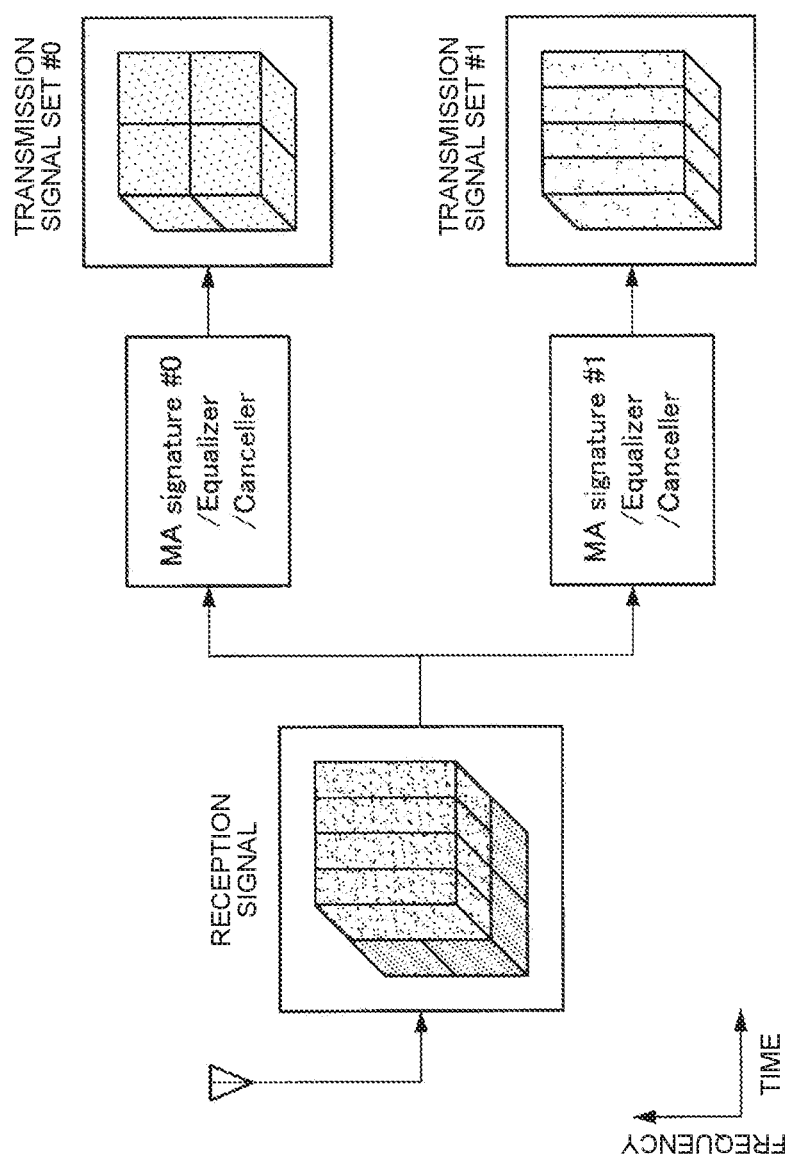
FIG. 15 is an explanatory diagram for describing an outline of still another example of NOMA transmission.

FIG. 15 is an explanatory diagram for explaining an outline of an example of NOMA transmission and illustrates an example of the reception device. As illustrated in FIG. 15, a received signal is received in a state where a plurality of transmission signals is multiplexed on the same frequency and time resources. In the reception device, in order to decode the multiplexed transmission signal set, the MA signature applied in the transmitter is applied, and a desired signal is extracted by channel equalization and an interference signal canceller. At this time, in a case where multiplexing is performed using the same MA signature, the influence of interference between multiplexed signals may increase, and decoding may be difficult.

As described above, in the NOMA transmission, the MA signature applied to the transmission device and the reception device needs to be shared between the transmission device and the reception device, and the MA signature needs to be applied without duplication. In the following description, when referring to resources, the MA signature is also included as one of the resources. Here, the resources including all of the frequency, time, and MA signature may be referred to as a multiple access (MA) resource, and the resources only for the frequency and time may be referred to as a multiple access (MA) physical resource.

<Method of Applying NOMA Instead of Pre-Emption>

As an alternative to transmitting by Pre-emption, a method using the above-described NOMA can be considered. In the following, an example of NOMA using a power difference is described, but this disclosure may be applied to a NOMA using signal processing such as spreading, interleaving, and scrambling.

Figure 16:
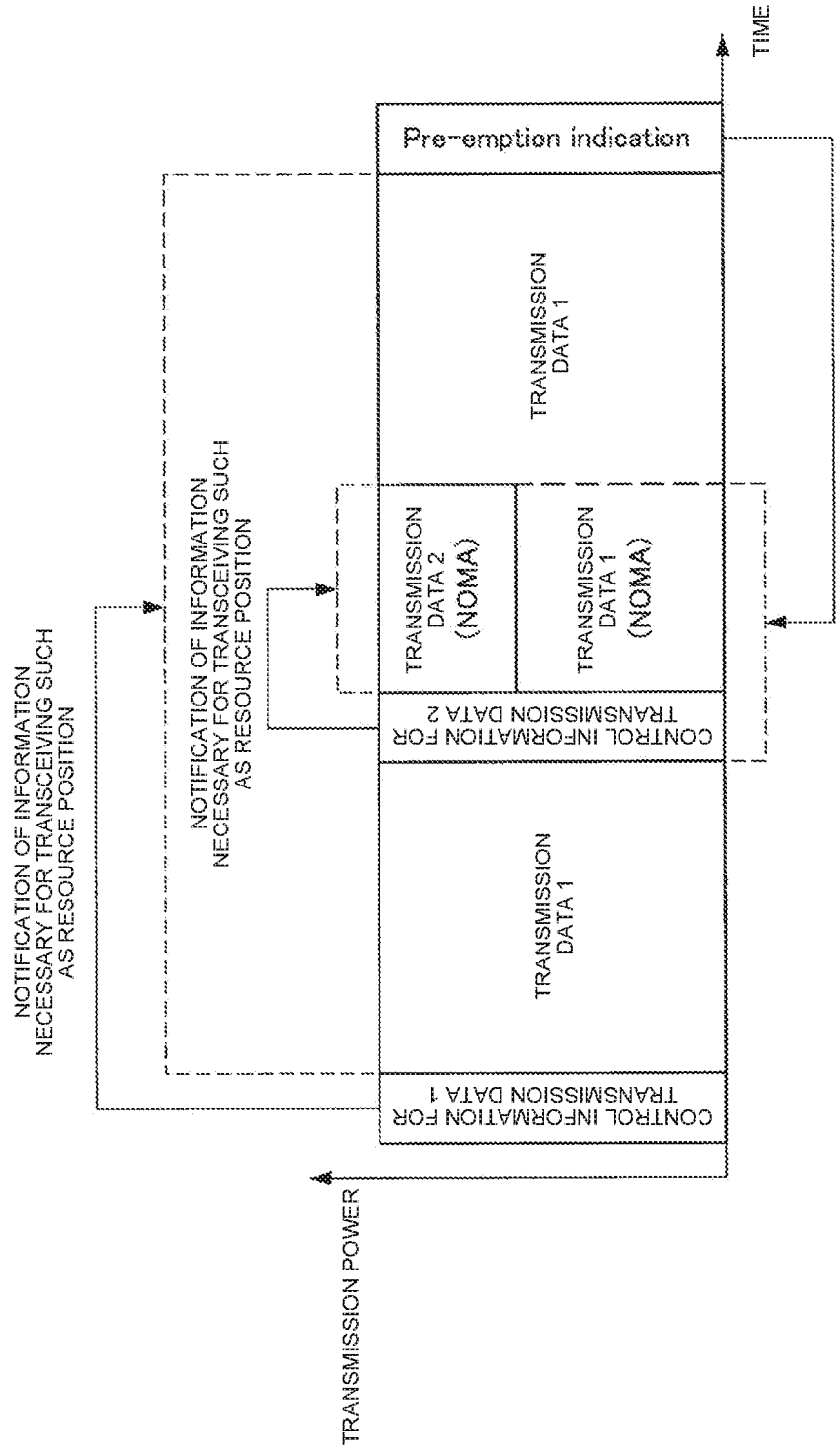
FIG. 16 is an explanatory diagram illustrating an example in which resources of transmission data are transmitted using by non-orthogonal multiplexing by NOMA.
Figure 17:
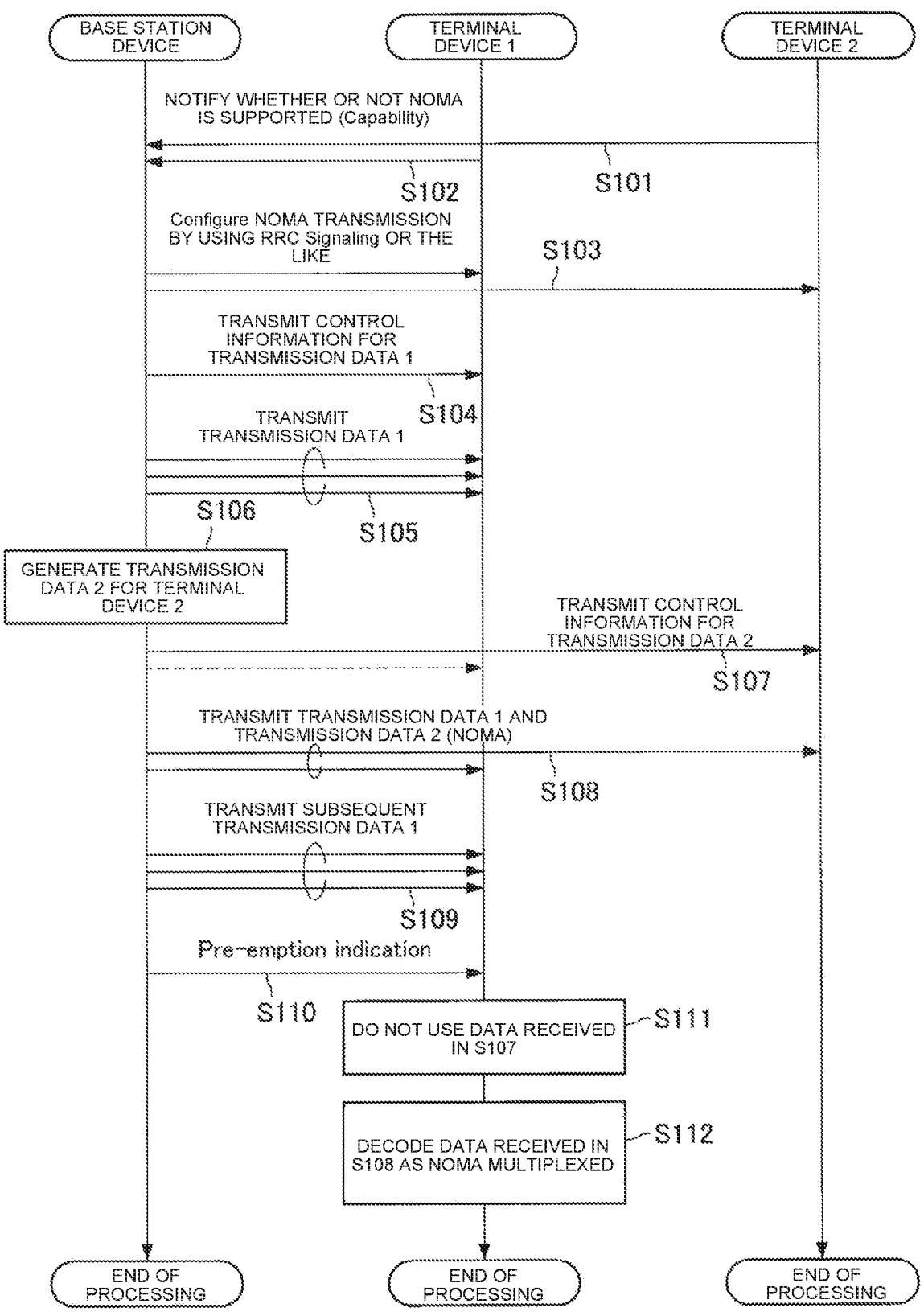
FIG. 17 is an explanatory diagram illustrating an operation of the base station device and the terminal devices in a sequence diagram.

For example, as illustrated in FIG. 8, instead of using all the resources of the transmission data 1 by the Pre-emption, it is conceivable that the resources of the transmission data 1 are transmitted using by non-orthogonal multiplexing by NOMA. FIG. 16 is an explanatory diagram illustrating an example in which the resources of the transmission data 1 are transmitted using by non-orthogonal multiplexing by NOMA. FIG. 16 illustrates an example in which the transmission data 1 and the transmission data 2 are multiplexed by NOMA using a power difference. FIG. 17 is an explanatory diagram illustrating operations of the base station device and the terminal devices 1 and 2 in a sequence diagram.

The terminal devices 1 and 2 notify the base station device whether or not the terminal devices support NOMA at an arbitrary timing (Steps S101 and S102). Here, it is assumed that both the terminal devices 1 and 2 notify the base station device that the terminal devices support NOMA. The base station device sets (configures) NOMA communication with the terminal devices 1 and 2 by using RRC signaling or the like (Step S103).

Next, the base station device transmits control information for transmission data 1 to the terminal device 1 in order to transmit data (transmission data 1) to the terminal device 1 (Step S104). Thereafter, the base station device transmits the transmission data 1 to the terminal device 1 (Step S105).

When the transmission data 2 for the terminal device 2 is generated while the base station device is transmitting the transmission data 1 (Step S106), the base station device temporarily stops transmission of the transmission data 1, and the control information for transmission data 2 is transmitted to the terminal device 2 in order to transmit data (transmission data 2) to the terminal device 2 (Step S107). In this example, in the control information for transmission data 2, some resources of transmission data 1 are transmitted by Pre-emption. Thereafter, the base station device transmits the transmission data 2 by NOMA with the transmission data 1 (Step S108). The data transmitted by the base station device in this Step S107 can be received not only by the terminal device 2 but also by the terminal device 1. A broken line in FIG. 17 indicates that the terminal device 1 also can receive the data transmitted by the base station device in Step S107.

When the transmission of the transmission data 2 is completed, the base station device restarts the transmission of the transmission data 1 (Step S109). When the transmission of the transmission data 1 is completed, the base station device transmits a Pre-emption indication to the terminal device 1 (Step S110). When receiving the Pre-emption indication, the terminal device 1 recognizes that this data is transmitted by the Pre-emption resource. Thus, the data received in Step S107 is not used (Step S111), and the data received in Step S108 is decoded as NOMA multiplexed (Step S112). Note that, here, an example is described in which the notification is made with the Pre-emption indication, but another notification different from the Pre-emption indication may be used.

The terminal device 2 receives the control information for transmission data 2 and decodes the transmission data 2 multiplexed and transmitted by NOMA with the transmission data 1.

As described above, the base station device can reduce the amount of missing data in transmission data 1 by transmitting the transmission data 1 and the transmission data 2 by NOMA multiplexing, and thus the decoding characteristics of transmission data 1 are improved. Note that the sequence diagram illustrated in FIG. 17 illustrates an example in which the transmission data 2 to be transmitted to a different terminal device is generated while the transmission data 1 is being transmitted. However, the present disclosure is not limited thereto. The transmission data 1 and the transmission data 2 may be data transmitted to the same terminal device. The same applies to the following description.

Figure 18:
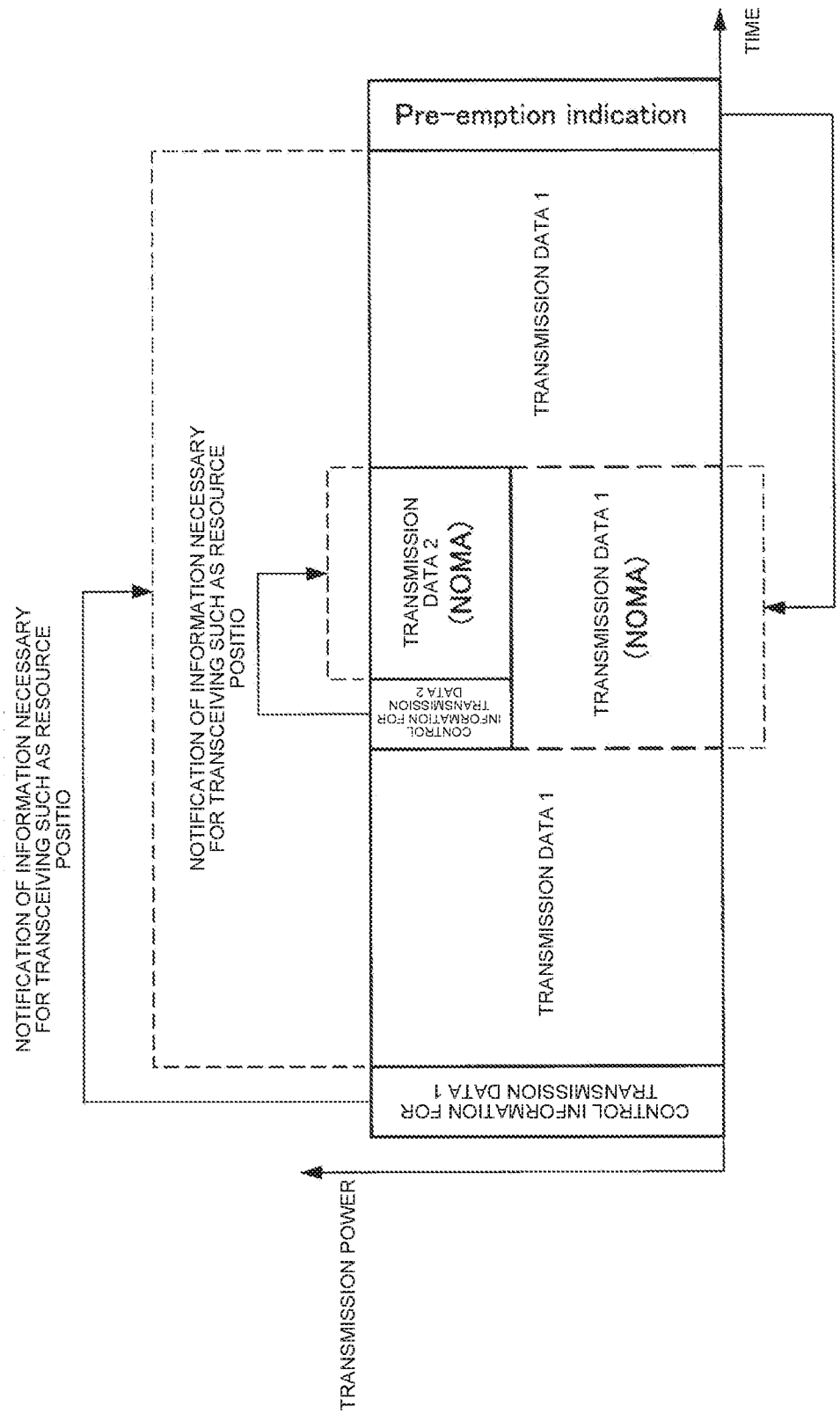
FIG. 18 is an explanatory diagram illustrating another example in which the resources of the transmission data are transmitted using by non-orthogonal multiplexing by NOMA.
Figure 19:
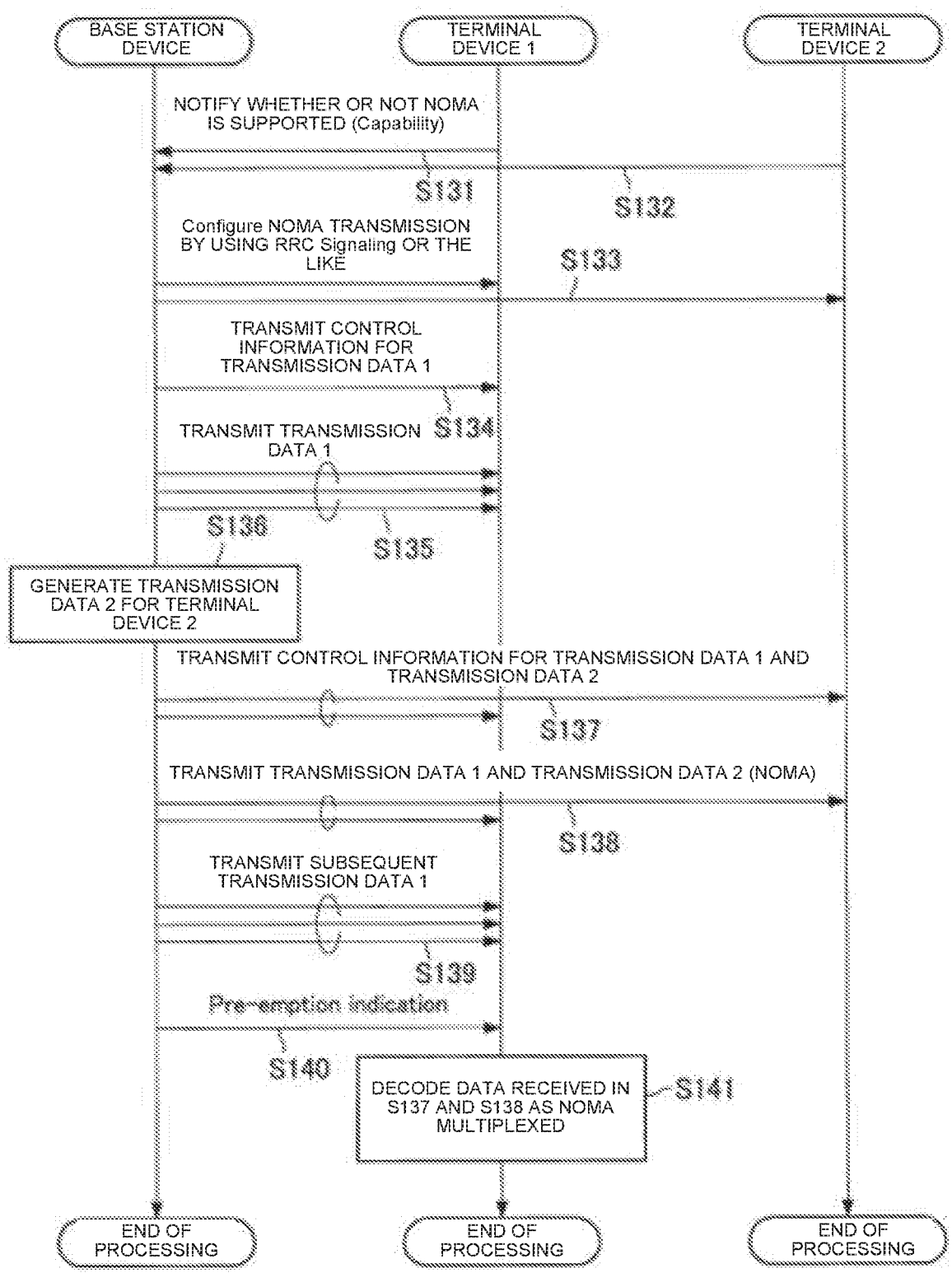
FIG. 19 is an explanatory diagram illustrating another operation of the base station device and the terminal devices in a sequence diagram.

Although the control information for transmission data 2 is not NOMA-multiplexed in the example illustrated in FIG. 16, the control information for transmission data 2 may be NOMA-multiplexed by the base station device. FIG. 18 is an explanatory diagram illustrating another example in which the resources of the transmission data 1 are transmitted using by non-orthogonal multiplexing by NOMA. FIG. 18 illustrates an example in which the transmission data 1, the control information for transmission data 2, and the transmission data 2 are multiplexed by NOMA using a power difference. FIG. 19 is an explanatory diagram illustrating operations of the base station device and the terminal devices 1 and 2 in a sequence diagram.

The terminal devices 1 and 2 notify the base station device whether or not the terminal devices support NOMA at an arbitrary timing (Steps S131 and S132). Here, it is assumed that both the terminal devices 1 and 2 notify the base station device that the terminal devices support NOMA. The base station device sets (configures) NOMA communication with the terminal devices 1 and 2 by using RRC signaling or the like (Step S133).

Next, the base station device transmits control information for transmission data 1 to the terminal device 1 in order to transmit data (transmission data 1) to the terminal device 1 (Step S134). Thereafter, the base station device transmits the transmission data 1 to the terminal device 1 (Step S135).

When the transmission data 2 for the terminal device 2 is generated while the base station device is transmitting the transmission data 1 (Step S136), the base station device temporarily stops transmission of the transmission data 1, and the control information for transmission data 2 is transmitted to the terminal device 2 by NOMA with the transmission data 1 in order to transmit data (transmission data 2) to the terminal device 2 (Step S137). In this example, in the control information for transmission data 2, some resources of transmission data 1 are transmitted by Pre-emption. Thereafter, the base station device transmits the transmission data 2 by NOMA with the transmission data 1 (Step S138).

When the transmission of the transmission data 2 is completed, the base station device restarts the transmission of the transmission data 1 (Step S139). When the transmission of the transmission data 1 is completed, the base station device transmits a Pre-emption indication to the terminal device 1 (Step S140). When receiving the Pre-emption indication, the terminal device 1 recognizes that this data is transmitted by the Pre-emption resource, and thus the data received in Steps S137 and S138 is decoded as NOMA multiplexed (Step S141). Note that, here, an example is described in which the notification is made with the Pre-emption indication, but another notification different from the Pre-emption indication may be used.

The terminal device 2 knows in advance that the control information is also transmitted by NOMA or attempts decoding by blind decoding. In the case of this example, the base station device can transmit all of the transmission data 1 without losing, and thus further improvement in the decoding characteristics of the transmission data 1 can be expected.

The base station device may transmit the transmission data 2 to the terminal device 2 without transmitting the control information for transmission data 2. This is a case where the control information for transmission data 2 is assigned to the terminal device 2 in advance. Grant-free transmission is an example thereof. Grant-free transmission means that the terminal device does not receive a dynamic resource allocation (Grant) from the base station device, and the terminal device performs transmission using appropriate resources from available frequency and time resources on which an instruction is given in advance by the base station device. That is, Grant-free transmission means that data transmission is performed without including Grant in downlink control information (DCI). Grant-free transmission is also referred to as Data transmission without grant or the like, but in the following description, it is referred to as Grant-free transmission for convenience. Further, Grant-free transmission may be read as semi-persistent scheduling (SPS) transmission or reception.

Further, it can be used not only for the uplink but also for the downlink and the sidelink. For example, in the case of a downlink, the base station device notifies the terminal device of resources to be used for downlink transmission in advance, so that the terminal device can receive data without receiving DCI.

Figure 20:
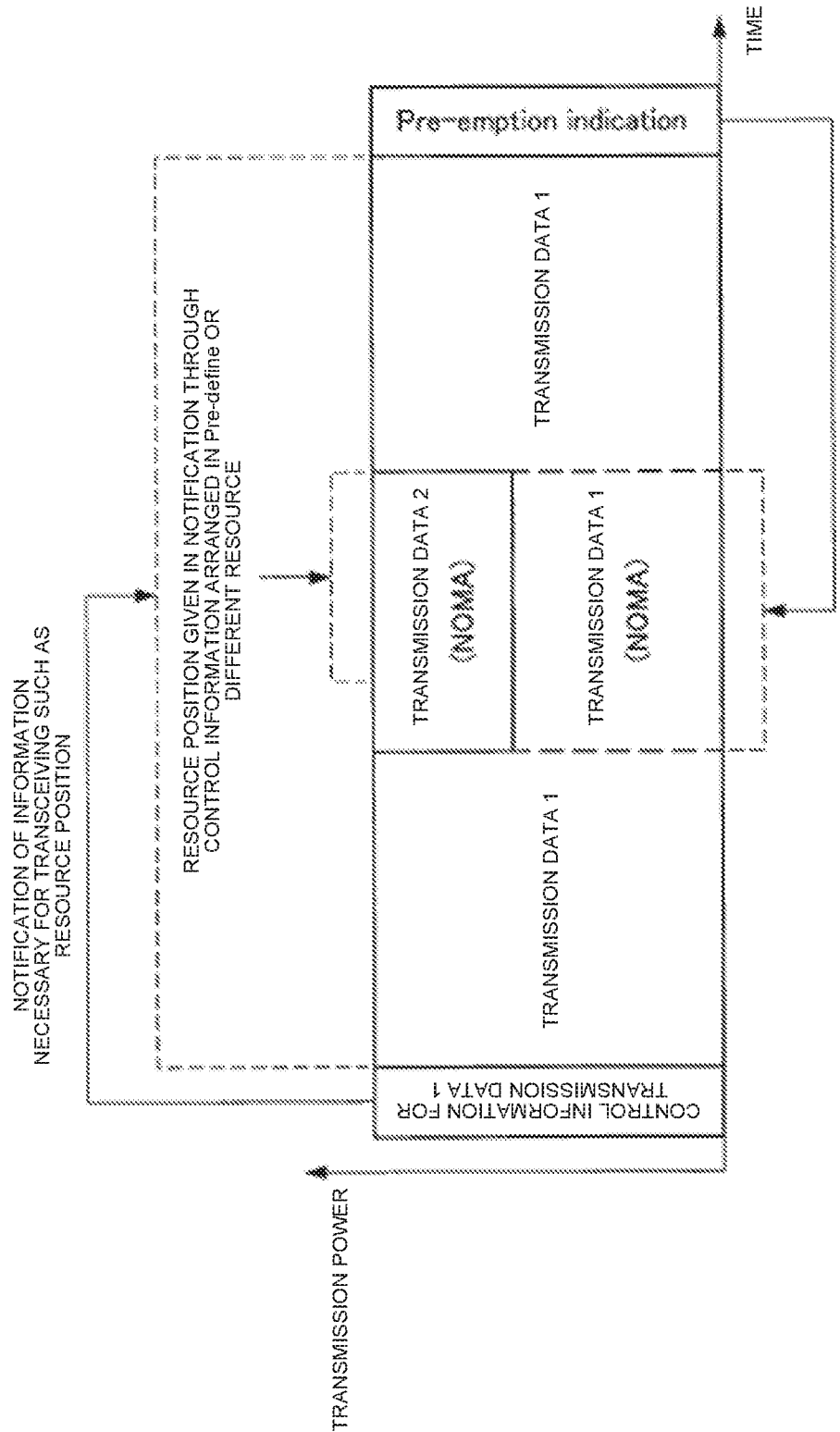
FIG. 20 is an explanatory diagram illustrating still another example in which the resources of the transmission data are transmitted using by non-orthogonal multiplexing by NOMA.
Figure 21:
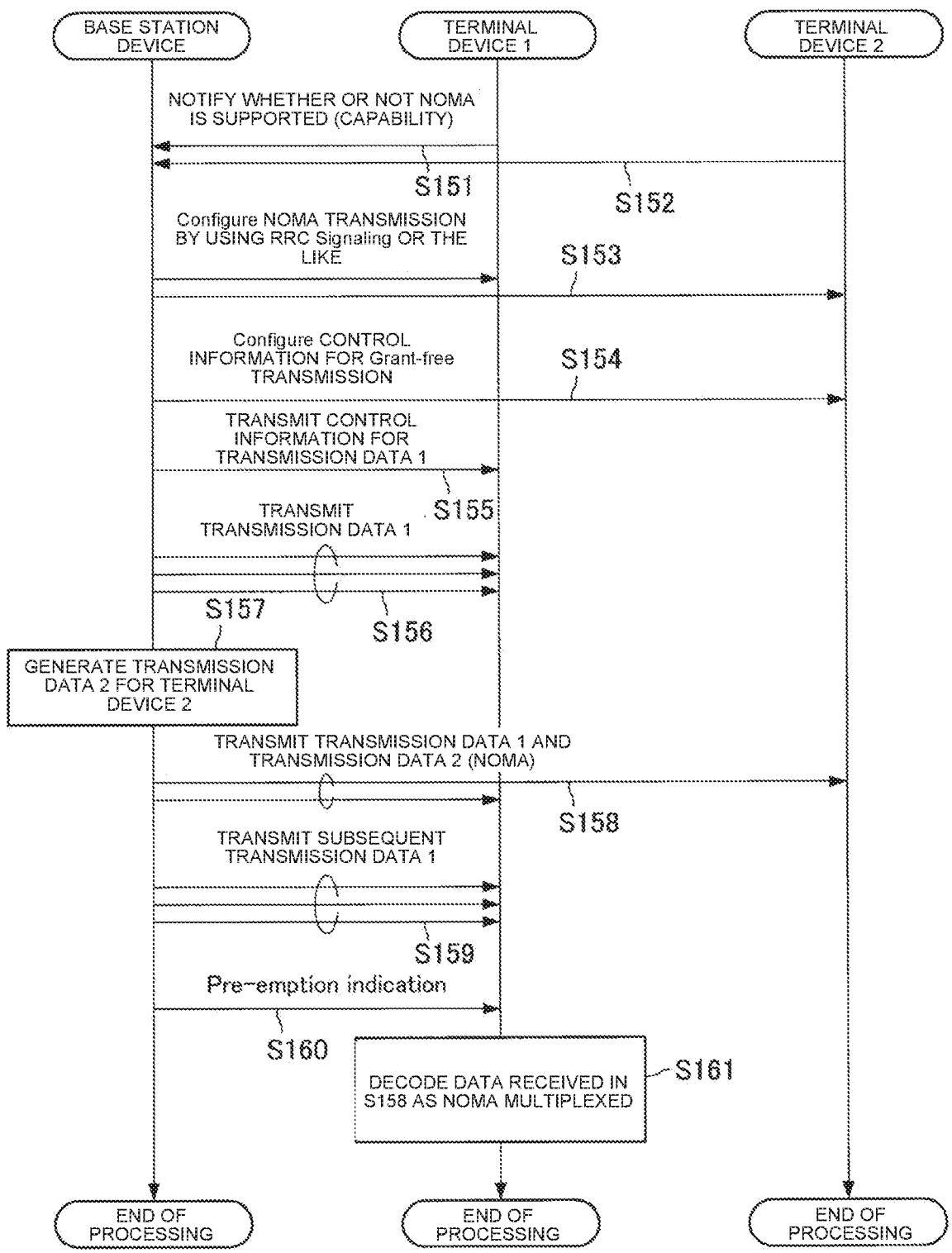
FIG. 21 is an explanatory diagram illustrating still another operation of the base station device and the terminal devices in a sequence diagram.

FIG. 20 is an explanatory diagram illustrating still another example in which the resources of the transmission data 1 are transmitted using by non-orthogonal multiplexing by NOMA. FIG. 20 illustrates an example in which the transmission data 1 and the transmission data 2 are multiplexed by NOMA using a power difference. In the example illustrated in FIG. 20, the base station device transmits the transmission data 2 to the terminal device 2 without transmitting the control information for transmission data 2. Further, FIG. 21 is an explanatory diagram illustrating operations of the base station device and the terminal devices 1 and 2 in a sequence diagram.

The terminal devices 1 and 2 notify the base station device whether NOMA is supported at an arbitrary timing (Steps S151 and S152). Here, it is assumed that both the terminal devices 1 and 2 notify the base station device that the terminal devices support NOMA. The base station device sets (configures) NOMA communication with the terminal devices 1 and 2 by using RRC signaling or the like (Step S153).

Next, the base station device transmits control information for transmission data 1 to the terminal device 1 in order to transmit data (transmission data 1) to the terminal device 1 (Step S154). Thereafter, the base station device transmits control information for transmission data 1 to terminal device 1 (Step S155), and subsequently transmits transmission data 1 (Step S156).

When the transmission data 2 for the terminal device 2 is generated while the base station device is transmitting the transmission data 1 (Step S157), the base station device transmits the transmission data 2 by NOMA with the transmission data 1 (Step S158). That is, the base station device transmits the transmission data 2 without transmitting the control information for transmission data 2.

When the transmission of the transmission data 2 is completed, the base station device restarts the transmission of the transmission data 1 (Step S159). When the transmission of the transmission data 1 is completed, the base station device transmits a Pre-emption indication to the terminal device 1 (Step S160). When receiving the Pre-emption indication, the terminal device 1 recognizes that this data is transmitted by the Pre-emption resource, and thus the data received in Step S158 is decoded as NOMA multiplexed (Step S161). Note that, here, an example is described in which the notification is made with the Pre-emption indication, but another notification different from the Pre-emption indication may be used.

The terminal device 2 decodes the transmission data 2 on the basis of, for example, the Grant-free control information given in notification in advance. Also in this case, the base station device can transmit the transmission data 1 without losing, and thus the improvement in the decoding characteristics of the transmission data 1 can be expected.

<Switch Between Pre-Emption and NOMA>

In a case where a terminal device that can receive NOMA and a terminal device that cannot receive NOMA are mixed in a system, the base station device is preferably provided with a configuration for switching between Pre-emption and NOMA for transmission. Hereinafter, an example will be described in which the base station device switches between Pre-emption and NOMA.

Figure 22B:
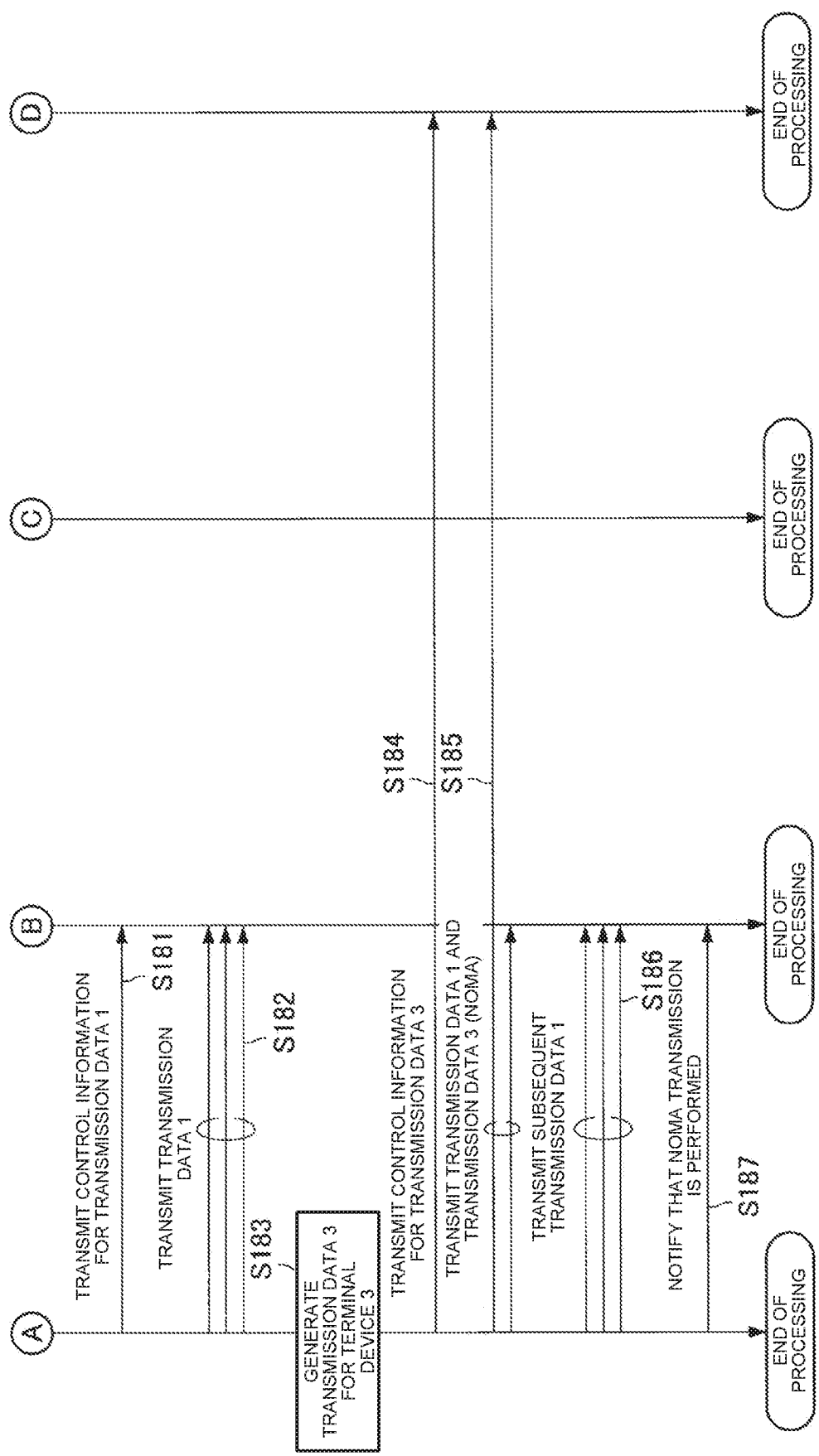
FIG. 22B is an explanatory diagram illustrating the still another operation of the base station device and the terminal devices in a sequence diagram.

First, a basic sequence will be described in which the base station device switches between Pre-emption and NOMA. FIGS. 22A and 22B are explanatory diagrams illustrating operations of the base station device and the terminal devices 1, 2, and 3 in a sequence diagram. Here, a description is given in which the terminal devices 1 and 3 support NOMA, and the terminal device 2 does not support NOMA. The terminal device 1 is a terminal device that supports NOMA and has the possibility of using a part of the transmission resource for the terminal device 2 or the terminal device 3. The terminal device 2 is a terminal device that does not support NOMA and has the possibility of performing transmission by Pre-emption by using a part of the transmission resource for the terminal device 1. The terminal device 3 is a terminal device that supports NOMA and has the possibility of performing transmission by NOMA (or Pre-emption) by using a part of the transmission resource for the terminal device 1.

The terminal devices 1 and 3 notify the base station device whether NOMA is supported at an arbitrary timing (Steps S171 and S172). The base station device sets (configures) NOMA communication with the terminal devices 1 and 3 by using RRC signaling or the like (Step S173). Here, for the terminal devices 1 and 3, the base station device sets whether or not there is a possibility of performing NOMA transmission or NOMA reception, or whether or not NOMA transmission or NOMA reception is necessarily performed. Here, in a case where it is set that there is a possibility of performing NOMA transmission or NOMA reception, the terminal devices 1 and 3 determine whether or not to perform NOMA transmission or NOMA reception on the basis of some criterion. For example, the terminal devices 1 and 3 may determine whether or not to perform NOMA transmission or NOMA reception on the basis of DCI information transmitted from the base station device to the terminal device, or may determine in accordance with a predetermined rule.

Next, the base station device transmits control information for transmission data 1 to the terminal device 1 in order to transmit data (transmission data 1) to the terminal device 1 (Step S174). Thereafter, the base station device transmits the transmission data 1 to the terminal device 1 (Step S175).

When the transmission data 2 for the terminal device 2 is generated while the base station device is transmitting the transmission data 1 (Step S176), the base station device temporarily stops transmission of the transmission data 1, and the control information for transmission data 2 is transmitted to the terminal device 2 in order to transmit data (transmission data 2) to the terminal device 2 (Step S177). In this example, in the control information for transmission data 2, some resources of transmission data 1 are transmitted by Pre-emption. Thereafter, the base station device transmits the transmission data 2 (Step S178). Here, since terminal device 2 does not support NOMA, the base station device transmits only the transmission data 2 as illustrated in FIG. 8.

When the transmission of the transmission data 2 is completed, the base station device restarts the transmission of the transmission data 1 (Step S179). When the transmission of the transmission data 1 is completed, the base station device transmits a Pre-emption indication to the terminal device 1 (Step S180).

Next, in a case where it is necessary to transmit the transmission data 1 to the terminal device 1 again, the base station device transmits control information for transmission data 1 to the terminal device 1 in order to transmit the transmission data 1 to the terminal device 1 (Step S181). Thereafter, the base station device transmits the transmission data 1 to the terminal device 1 (Step S182).

When the transmission data 3 for the terminal device 3 is generated while the base station device is transmitting the transmission data 1 (Step S183), the base station device temporarily stops transmission of the transmission data 1, and the control information for transmission data 2 is transmitted to the terminal device 2 in order to transmit data (transmission data 3) to the terminal device 3 (Step S184). In this example, in the control information for transmission data 2, some resources of transmission data 1 are transmitted by Pre-emption. Thereafter, the base station device transmits the transmission data 3 by NOMA with the transmission data 1 (Step S185).

When the transmission of the transmission data 3 is completed, the base station device restarts the transmission of the transmission data 1 (Step S186). When the transmission of the transmission data 1 is completed, the base station device notifies the terminal device 1 that the NOMA transmission is performed (Step S187).

By transmitting data in such a sequence, the base station device can switch between Pre-emption and NOMA for transmission even when a terminal device that can receive NOMA and a terminal device that cannot receive NOMA are mixed.

In the operation as in the example illustrated in FIGS. 22A and 22B, the terminal devices 1 and 3 are mainly required to determine whether Pre-emption is performed or NOMA multiplex transmission is performed and receive the result. Here, an example of a method in which the base station device notifies the terminal device for determining Pre-emption or NOMA is described.

(Notification by System Information Block (SIB))

A terminal device supporting NOMA may switch between Pre-emption and NOMA by using an SIB given in notification periodically or aperiodically from the base station device. Since the terminal devices in the same beam can be notified collectively of the SIB from the base station device, the control information amount can be reduced.

(Notification (Including Pre-Emption Indication) by Group DCI or Terminal-Specific DCI)

The base station device may notify the terminal device of a flag indicating whether the data to be transmitted is Pre-emption or NOMA multiplexing by using the group DCI or the terminal-specific DCI. For example, if the flag is 0, the data is transmitted by Pre-emption, and if the flag is 1, the data is NOMA-multiplexed data. Further, the base station device may assign a different bit sequence to each of the Pre-emption and the NOMA, and notify the terminal device by the group DCI or the terminal-specific DCI.

Figure 23:
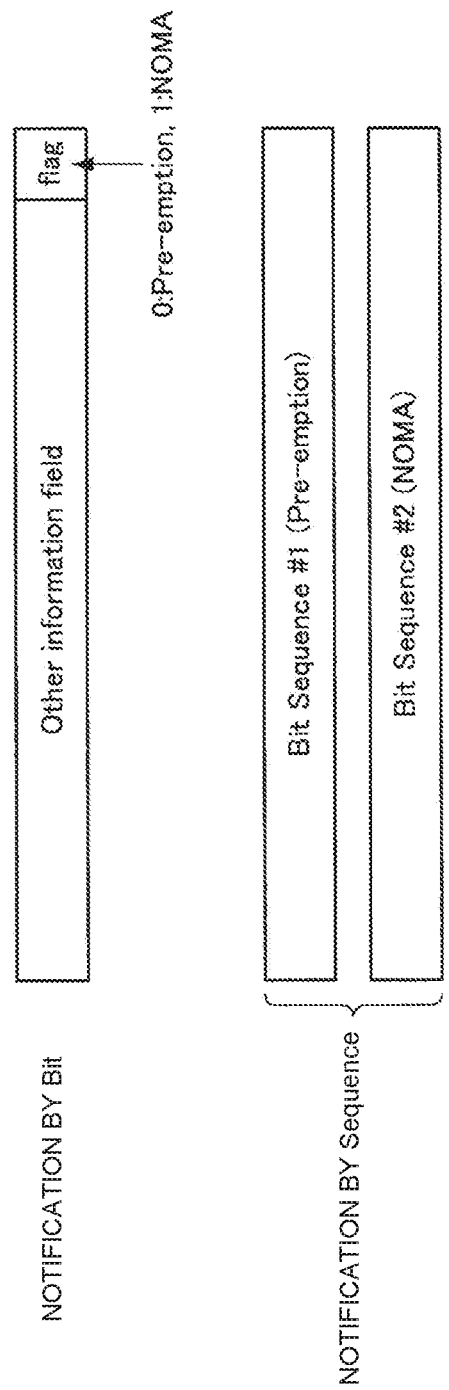
FIG. 23 is an explanatory diagram illustrating an example of data given in notification by the base station device.

FIG. 23 is an explanatory diagram illustrating an example of data given in notification by the base station device. FIG. 23 illustrates an example of providing notification of whether data to be transmitted is Pre-emption or NOMA multiplexing using a flag or a bit sequence.

Figure 24:
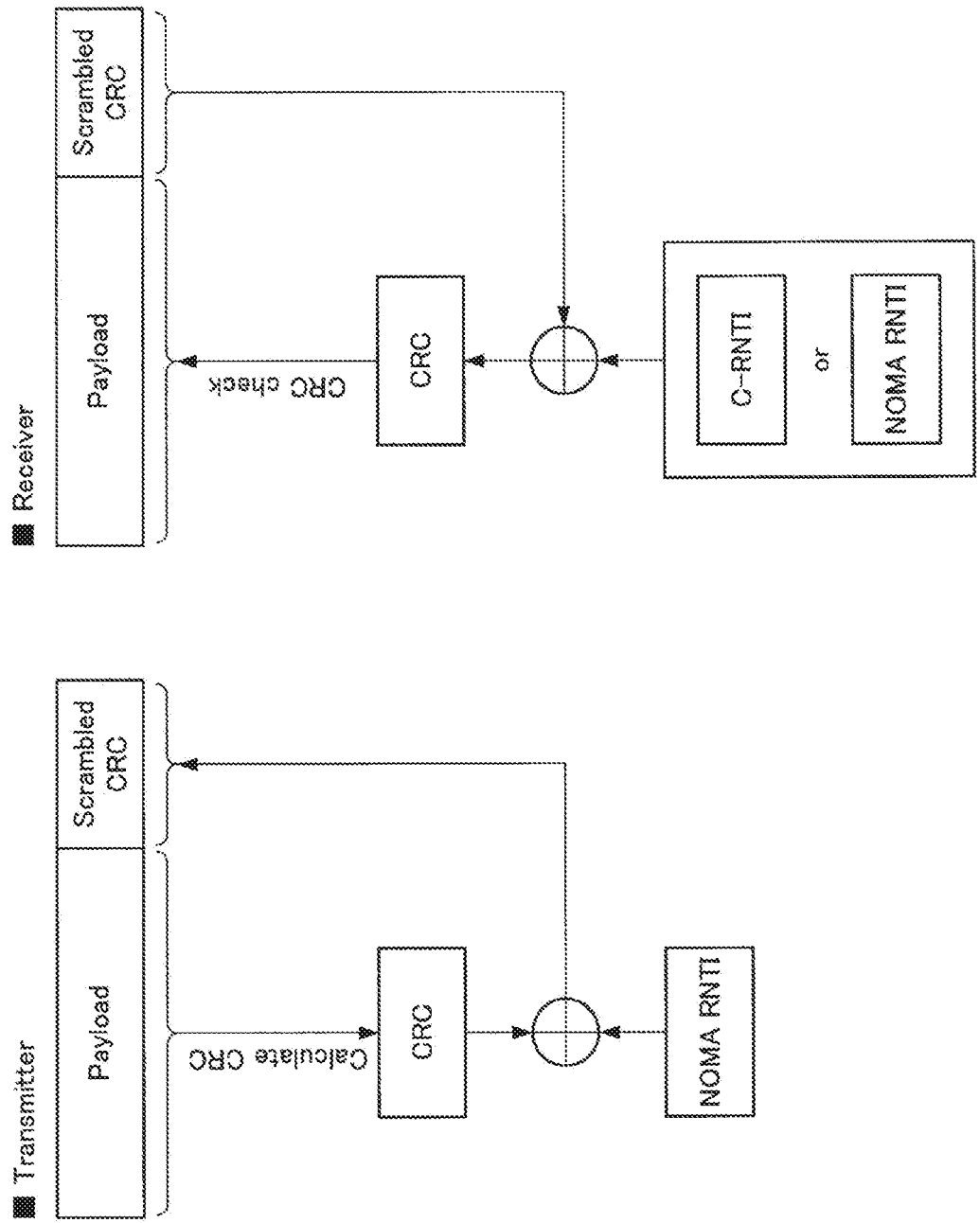
FIG. 24 is an example in which the base station device provides notification of whether the data to be transmitted is Pre-emption or NOMA multiplexing by an RNTI used in CRC scrambling of DCI.

The base station device may provide notification of whether the data to be transmitted is Pre-emption or NOMA multiplexing by the RNTI used in CRC scrambling of DCI. In this case, the base station device notifies the terminal device of the RNTI for Pre-emption and the RNTI for NOMA in advance. The terminal device determines the RNTI used in CRC scrambling of DCI by checking at the time of the CRC check. FIG. 24 is an example in which the base station device provides notification of whether the data to be transmitted is Pre-emption or NOMA multiplexing by the RNTI used in CRC scrambling of DCI.

Figure 25:
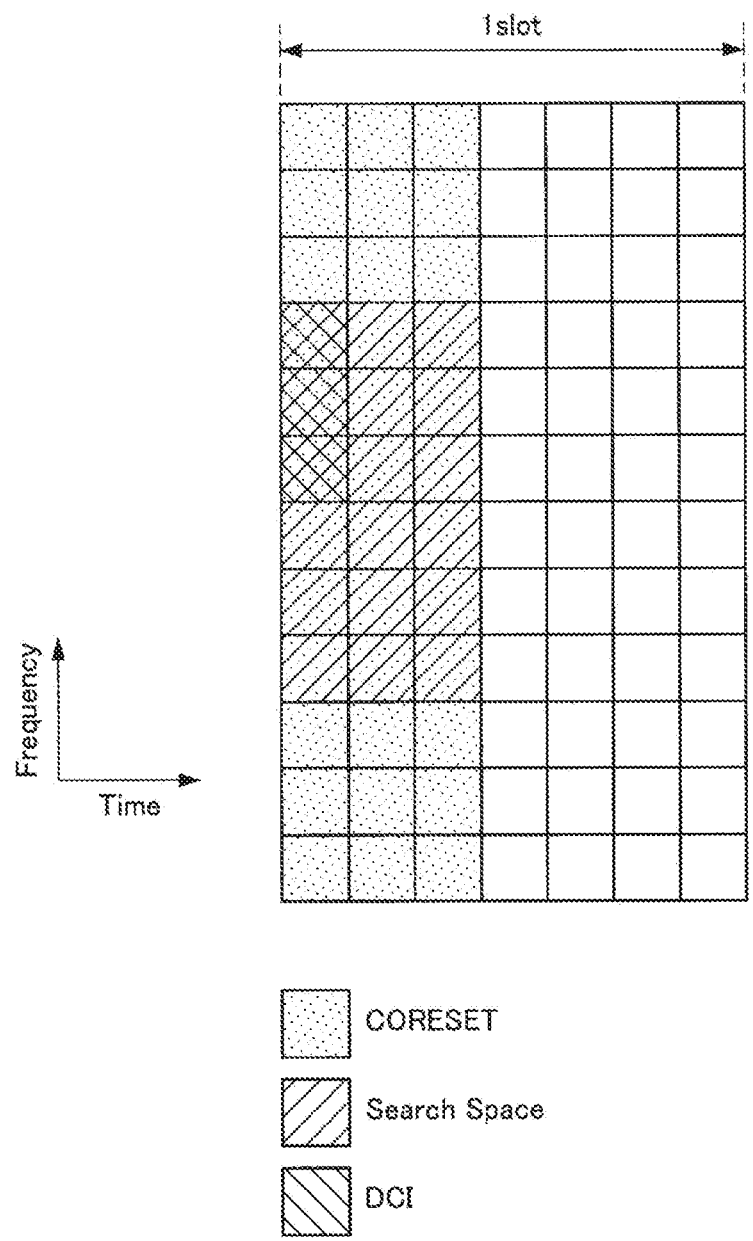
FIG. 25 is an explanatory diagram illustrating an arrangement example of CORESETs, Search Spaces, and DCI.

The base station device may provide notification of whether the data to be transmitted is Pre-emption or NOMA multiplexing by Control Resource Sets or Search Spaces to which DCI is transmitted. The Control Resource Set may be referred to as CORESET, control subband, or the like. Hereinafter, it is referred to as CORESET for convenience. The CORESET indicates a resource including one or more Search Spaces in which the terminal performs blind decoding. FIG. 25 is an explanatory diagram illustrating an arrangement example of CORESETs, Search Spaces, and DCI. The base station device sets the CORESET in the terminal device. The terminal device calculates the resource position of the Search Space from the set resources, and decodes DCI by blind-decoding the Search Space.

Figure 26:
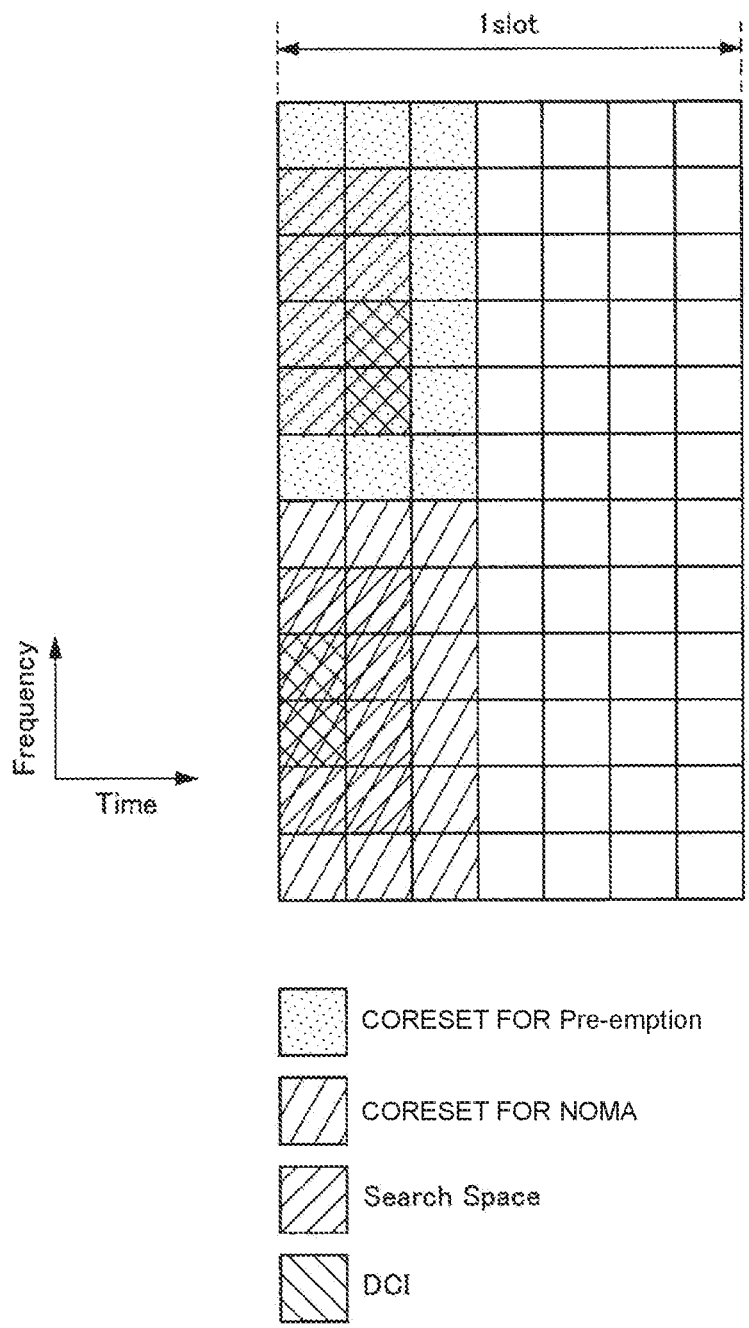
FIG. 26 is an explanatory diagram illustrating another arrangement example of CORESETs, Search Spaces, and DCI.

The base station device may notify the terminal device of the CORESET for Pre-emption and CORESET for NOMA in advance. FIG. 26 is an explanatory diagram illustrating another arrangement example of CORESETs, Search Spaces, and DCI. In the example illustrated in FIG. 26, the CORESET for Pre-emption and the CORESET for NOMA are provided. The base station device switches the resource of the CORESET in accordance with Pre-emption or NOMA and transmits the resource.

Figure 27:
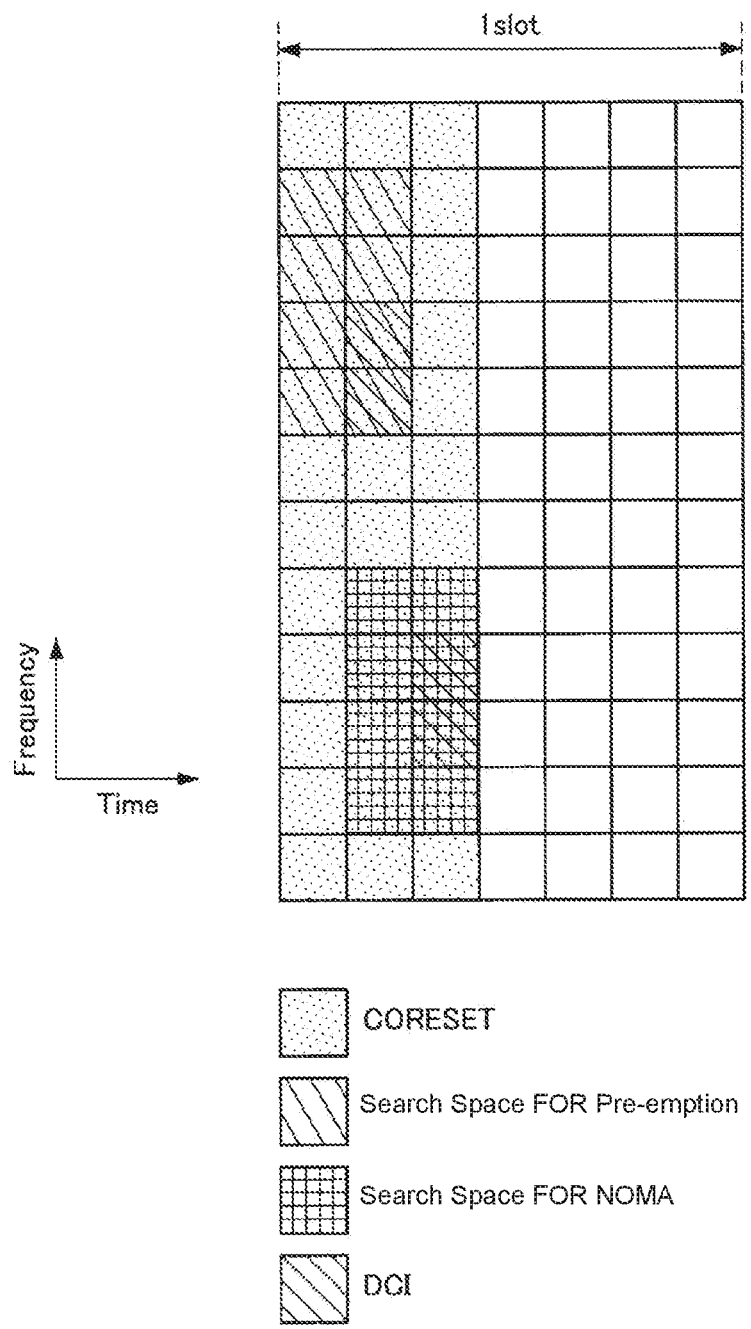
FIG. 27 is an explanatory diagram illustrating still another arrangement example of CORESETs, Search Spaces, and DCI.

In a case where the same CORESET is set in Pre-emption or NOMA, the Search Space for the Pre-emption and the Search Space for the NOMA may further differ in the CORESET. FIG. 27 is an explanatory diagram illustrating still another arrangement example of CORESETs, Search Spaces, and DCI. In the example illustrated in FIG. 27, Search Spaces for Pre-emption and Search Spaces for NOMA are arranged in one CORESET. Therefore, the base station device may transmit DCI in a different Search Space depending on in accordance with Pre-emption or NOMA.

The base station device may transmit the DCI in a different DCI format depending on whether the transmission data is Pre-emption or NOMA. The terminal device determines from the transmitted DCI format whether the data transmitted from the base station device is Pre-emption or NOMA.

The base station device may notify the terminal device of a different MCS index depending on whether the transmission data is Pre-emption or NOMA. For example, when the first bit of the MCS index is 1, it may indicate that data transmitted from the base station device is NOMA.

(Notification by DMRS Pattern)

In order to determine whether the transmission data is Pre-emption or NOMA, a DMRS pattern for Pre-emption and a DMRS pattern for NOMA may be assigned to the terminal device in advance. Then, the base station device may transmit a DMRS of a different pattern depending on Pre-emption or NOMA.

(Determination by Position from Base Station)

The terminal device may determine Pre-emption when the distance to the base station device is short and NOMA when the distance is long. For example, another terminal device that uses a part of resources may be limited to only a terminal that is close to the base station device. In a case where the distances of both terminal devices from the base station device are short, it is not possible to use NOMA using the power difference, so transmission is performed in Pre-emption. On the other hand, in an environment where NOMA using the power difference can be used, for example, in an environment where there is a difference in the distance from the base station, it is possible to make a determination to use NOMA. Further, the determination may be made from the transmission power of the terminal device instead of the distance from the base station. When the transmission power is large, it may be determined that the distance to the base station device is long, and when the transmission power is small, it may be determined that the distance to the base station device is short.

(Determination with Receiving Multiplexed Control Information of Terminal)

A terminal device using some resources may receive control information destined for another terminal device to make a determination. In the example illustrated in FIG. 16, the terminal device 1 that receives the transmission data 1 also decodes the control information for transmission data 2, and determines whether it is a Pre-emption or a NOMA. If decoding is not possible, the terminal device 1 can determine that the resource thereof is Pre-emption.

(Determination in Combination with Information Used by Code Block Group (CBG))

Figure 28:
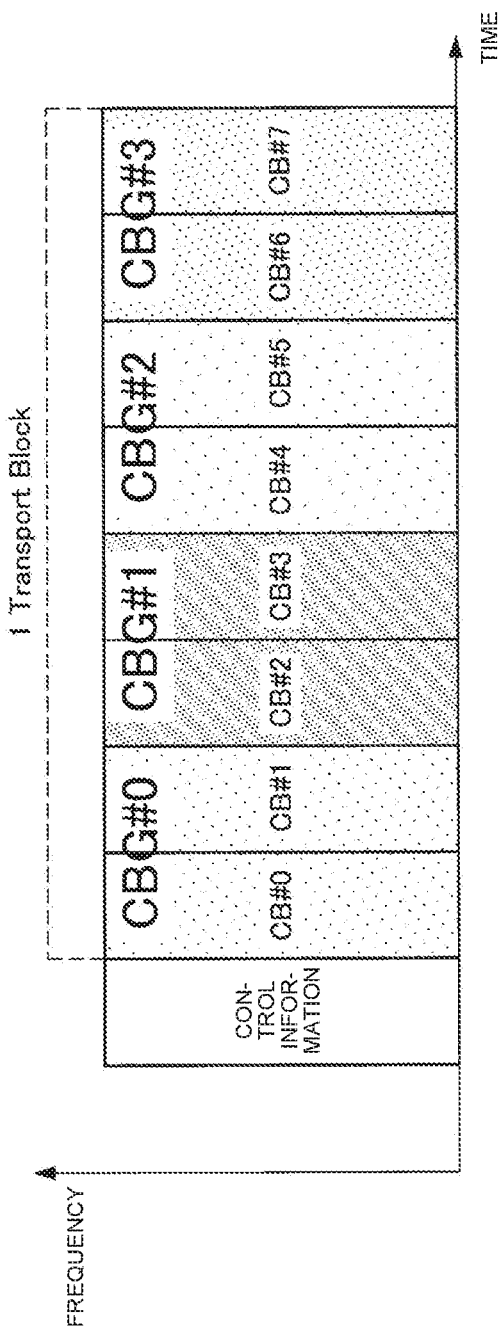
FIG. 28 is an explanatory diagram illustrating an example of a relationship between CBs and CBGs.

CBG indicates collections of one or more code blocks (CBs) into several Groups. FIG. 28 is an explanatory diagram illustrating an example of a relationship between the CBs and the CBGs. For example, as illustrated in FIG. 28, it is assumed that one transport block (TB) includes eight CBs. The CBG indicates those CBs divided into one or more Groups. The example of FIG. 28 is an example in which every two CBs are grouped into one Group, and CBs are equally divided into four CBGs. Other than the example of FIG. 28, every four CBs are grouped into one Group, and CBs are divided into two CBGs. Further, the CBGs need not be divided equally. For example, the CBs may be divided such that CBG #0 and CBG #1 include three CBs, and CBG #2 includes two CBs. Further, one CBG may include all CBs. Information such as how many CBGs exist and how many CBs are included in one CBG may be given in notification semi-statically by RRC Signaling, System Information, or the like or may be given in notification dynamically by DCI or the like. According to the number of CBGs of which notification is provided and the number of CBs corresponding to the TB size, each CB is allocated to the CBG according to a predetermined rule.

Whether to perform CBG transmission (CBG-based transmission) is set by the base station device in the terminal device. At this time, settings can be made for each link such as a downlink and an uplink. In a case where CBG-based transmission is not set, transmission is performed only for TB (TB-based transmission).

In the case of CBG transmission, information such as which CBG is being transmitted is required. As one of the notification methods of this information, there is a method of providing notification by DCI. The DCI is information given in notification through the control information in FIG. 28. Information of CBG included in DCI may be referred to as CBG transmission information (CBGTI). The number of bits of the CBGTI may fluctuate in accordance with a preset maximum number of CBGs. For example, in a case where the maximum number of CBGs is set to 4, CBGTI may have a 4-bit field in DCI.

As an application of CBG, it is conceivable to provide notification of information for determining how to combine CBGs at the time of retransmission. This information may be referred as to CBG flushing out information (CBGFI). The CBGFI may be a single bit or multiple bits in DCI. How to handle the information represented by CBGFI is not limited to a specific one. As an example, it is conceivable that in a case where the CBGFI bit is 0, similarly to the normal operation, the retransmitted CBG is decoded in combination with the first transmitted CBG, and on the other hand, in a case where the CBGFI bit is 1, only the retransmitted CBG is decoded without combination with the first transmitted CBG.

In this regard, the base station device may provide notification of information indicating whether data to be transmitted is Pre-emption or NOMA multiplexing in combination with information used in the CBG. That is, the base station device may provide notification of information indicating whether the data to be transmitted is Pre-emption or NOMA multiplexing in combination with CBGTI, CBGFI, and new data indicator (NDI).

The base station device notifies the terminal device by using CBGTI, CBGFI, and NDI. The CBGFI is used at the time of retransmission and is a bit without information in a case where the NDI indicates initial transmission. Further, in the case of the first transmission, the CBGTI is considered to basically transmit all CBGs, and thus, in some cases, the CBGTI is also a bit without information. In this regard, when the NDI indicates the initial transmission, and the CBGFI is a specific value, for example, 1, the base station device may indicate that a part of the previous transmission resources is transmitted by NOMA multiplexing. At this time, the base station device uses CBGTI as a bit to provide notification of the position of the NOMA-multiplexed CBG.

Figure 29:
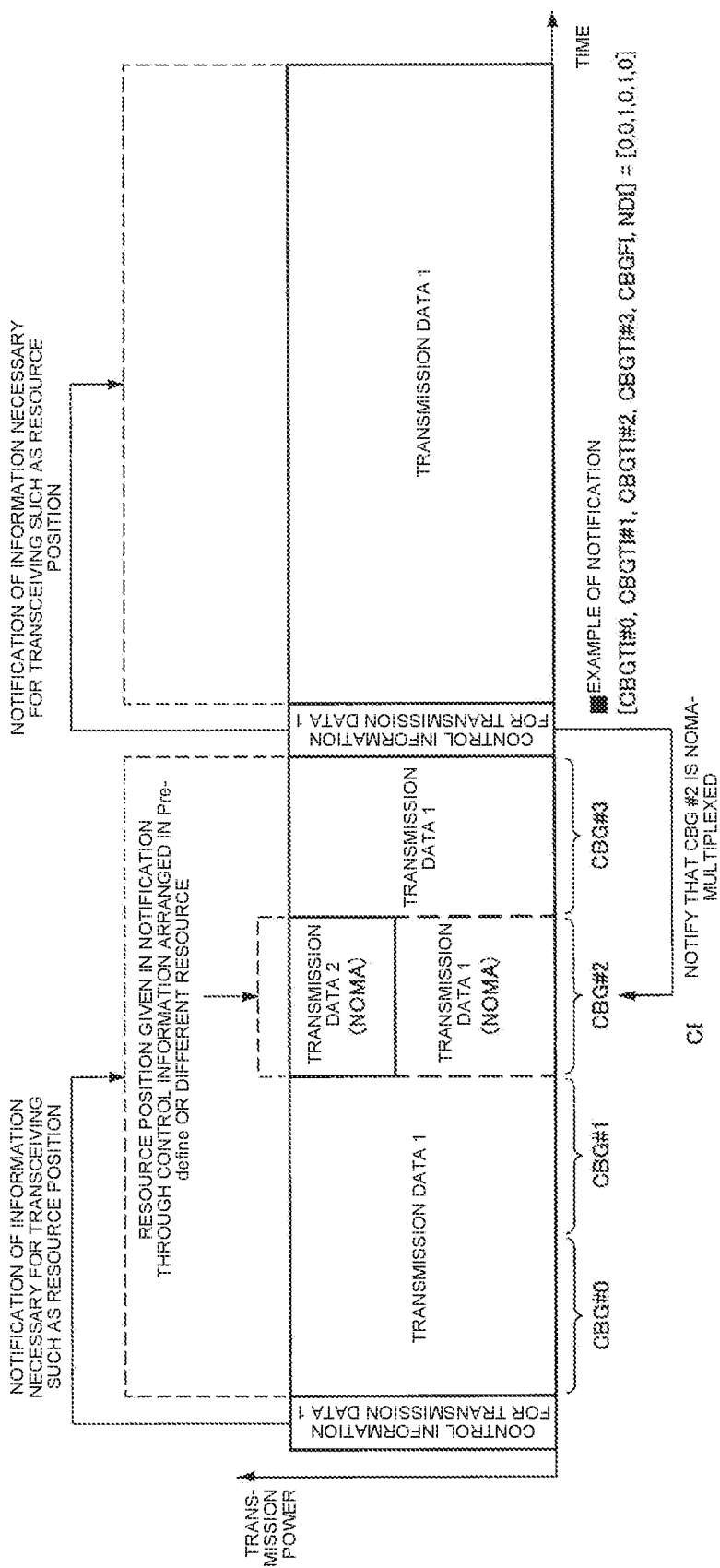
FIG. 29 is an explanatory diagram illustrating an example of information given in notification by the base station device.

FIG. 29 is an explanatory diagram illustrating an example of information given in notification by the base station device. The terminal device determines whether it is Preemption or NOMA multiplexing from CBGTI, CBGFI, and NDI included in the control information for transmission data 1 transmitted in the next frame transmitted by NOMA. First, it is assumed that NDI indicates initial transmission (here, 0 is assumed as initial transmission). Here, the terminal device checks the CBGFI, and indicates a normal initial transmission when it is 0, and indicates that a place where NOMA transmission is performed exists in the previous frame when it is 1. In a case where the CBGFI is 1, it is assumed that all CBGs are transmitted in the next frame, and the CBGTI is used to provide notification of the CBG transmitted by NOMA in the previous frame. In FIG. 29, CBG #2 is NOMA-multiplexed, and thus CBGTI is 1 only for #2. Accordingly, it is possible to provide notification of not only the control information of the next transmission frame but also the resource that is NOMA-multiplexed in the previous frame.

2. APPLICATION EXAMPLE

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or semi-permanently.

For example, the terminal device 2 may be realized as a mobile terminal such as a smartphone, a tablet personal computer (PC), a notebook PC, a portable game terminal, a portable/dongle mobile router, or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module (for example, an integrated circuit module configured on one die) mounted on these terminals.

<2.1. Application Example of Base Station Device>

First Application Example

Figure 30:
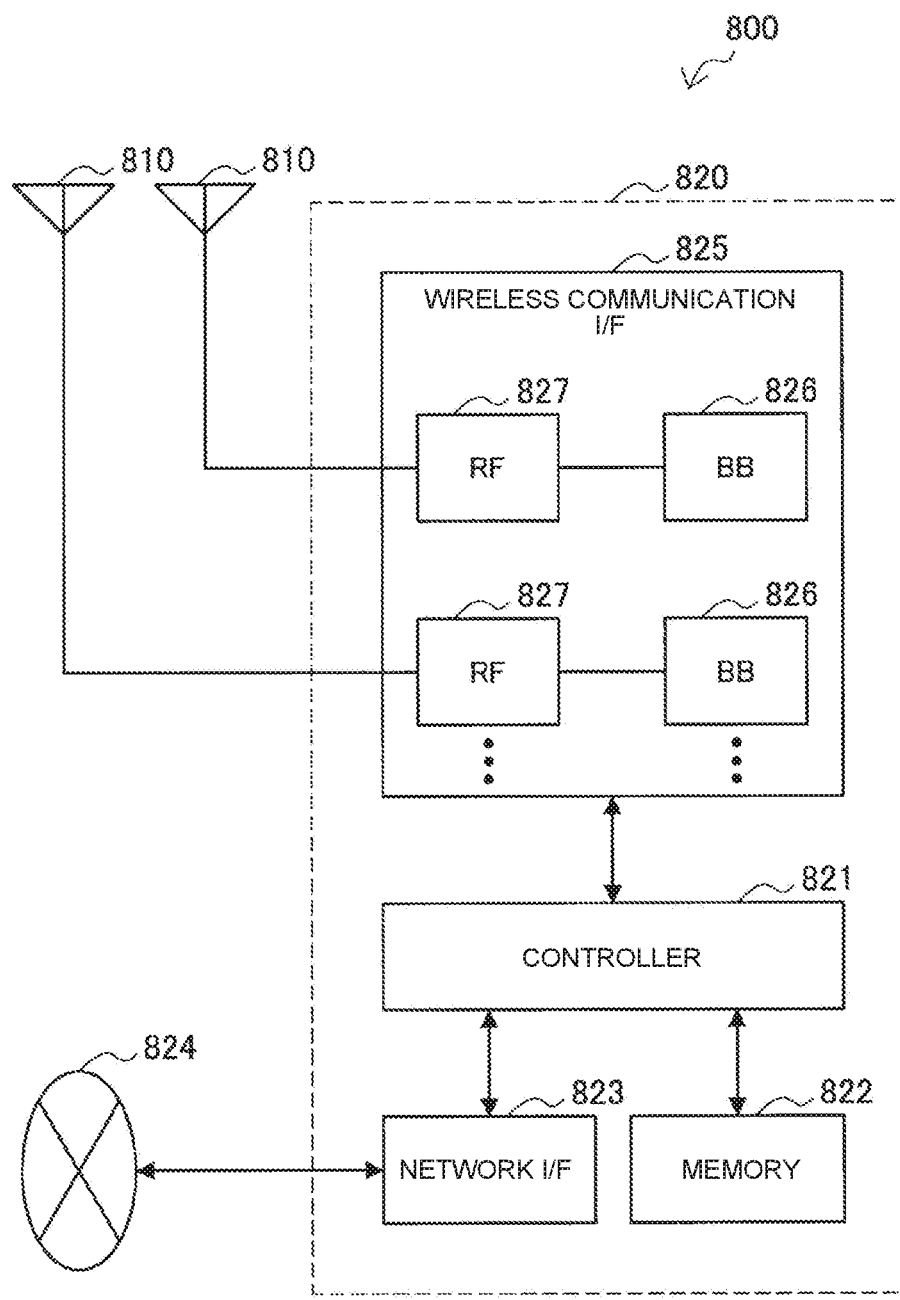
FIG. 30 is a block diagram illustrating a first example of a schematic configuration of an eNB to which the technology according to the present disclosure may be applied.

FIG. 30 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (for example, a plurality of antenna elements constituting a MIMO antenna) and is used for the base station device 820 to transmit and receive a wireless signal. The eNB 800 may include the plurality of the antennas 810 as illustrated in FIG. 30, and the plurality of antennas 810 may correspond to, for example, a plurality of frequency bands used by the eNB 800, respectively. Incidentally, although FIG. 30 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (for example, S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (for example, L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. On the other hand, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 30, and the plurality of BB processors 826 may correspond to, for example, a plurality of frequency bands used by the eNB 800, respectively. Further, the wireless communication interface 825 may also include a plurality of the RF circuits 827, as illustrated in FIG. 30, and the plurality of RF circuits 827 may, for example, correspond to a plurality of antenna elements, respectively. Note that FIG. 30 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 30, one or more constituent elements of the higher layer processing unit 101, the control unit 103, the receiving unit 105, and/or the transmitting unit 107 described with reference to FIG. 6 may be implemented in the wireless communication interface 825 (for example, the BB processor 826 and/or the RF circuit 827), the controller 821, and/or the network interface 823. For example, the wireless communication interface 825, the controller 821, and/or the network interface 823 transmit first control information and second control information, or receive control information request to transmit corresponding third control information. For example, in a processor included in the wireless communication interface 825, a function for performing these operations may be implemented. As a device that performs such an operation, the eNB 800, the base station device 820, or the above-described module may be provided, or a program for causing a processor to perform the above-described operation may be provided. Further, a readable recording medium on which the above-described program is recorded may be provided. Further, the transceiving antenna 109 may be implemented in the antenna 810.

Second Application Example

Figure 31:
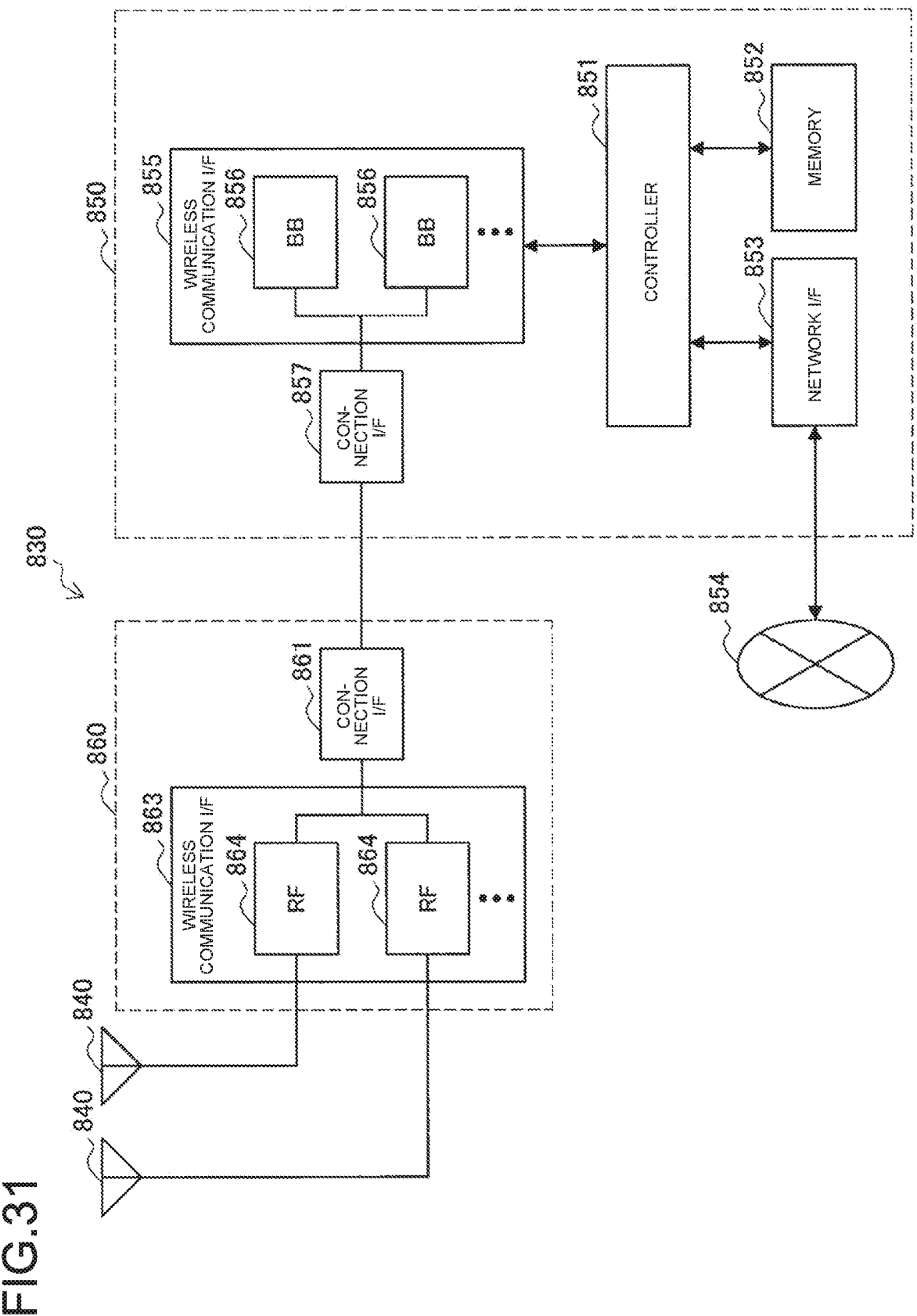
FIG. 31 is a block diagram illustrating a second example of a schematic configuration of the eNB to which the technology according to the present disclosure can be applied.

FIG. 31 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (for example, a plurality of antenna elements constituting a MIMO antenna), and is used for the RRH 860 to transmit and receive a wireless signal. The eNB 830 may include a plurality of the antennas 840 as illustrated in FIG. 27, and the plurality of antennas 840 may correspond to, for example, a plurality of frequency bands used by the eNB 830, respectively. Note that FIG. 31 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 30.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 30 except that the BB processor 856 is connected to an RF circuit 864 of the RRH 860 via the connection interface 857. The wireless communication interface 855 may include a plurality of the BB processors 856 as illustrated in FIG. 31, and the plurality of BB processors 856 may correspond to, for example, a plurality of frequency bands used by the eNB 830, respectively. Note that FIG. 31 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier, and the like, and transmits and receives a wireless signal via the antenna 840. The wireless communication interface 863 may include a plurality of the RF circuits 864 as illustrated in FIG. 31, and the plurality of RF circuits 864 may, for example, correspond to a plurality of antenna elements, respectively. Note that FIG. 31 illustrates an example in which the wireless communication interface 863 includes the plurality of RF circuits 864, but the wireless communication interface 863 may include the single RF circuit 864.

In the eNB 830 illustrated in FIG. 31, the higher layer processing unit 101, the control unit 103, the receiving unit 105, and/or the transmitting unit 107 described with reference to FIG. 6 may be implemented in the wireless communication interface 855, the wireless communication interface 863 (for example, the BB processor 856 and/or the RF circuit 864), the controller 851, and/or the network interface 853. For example, the wireless communication interface 855, the wireless communication interface 863, the controller 851, and/or the network interface 853 transmit first control information and second control information, or receive control information request to transmit corresponding third control information. For example, in a processor included in the wireless communication interface 855 and/or the wireless communication interface 863, a function for performing these operations may be implemented. As a device that performs such an operation, the eNB 830, the base station device 850, or the above-described module may be provided, or a program for causing a processor to perform the above-described operation may be provided. Further, a readable recording medium on which the above-described program is recorded may be provided. Further, the transceiving antenna 109 may be implemented in the antenna 840.

<2.2. Application Example of Terminal Device>

First Application Example

Figure 32:
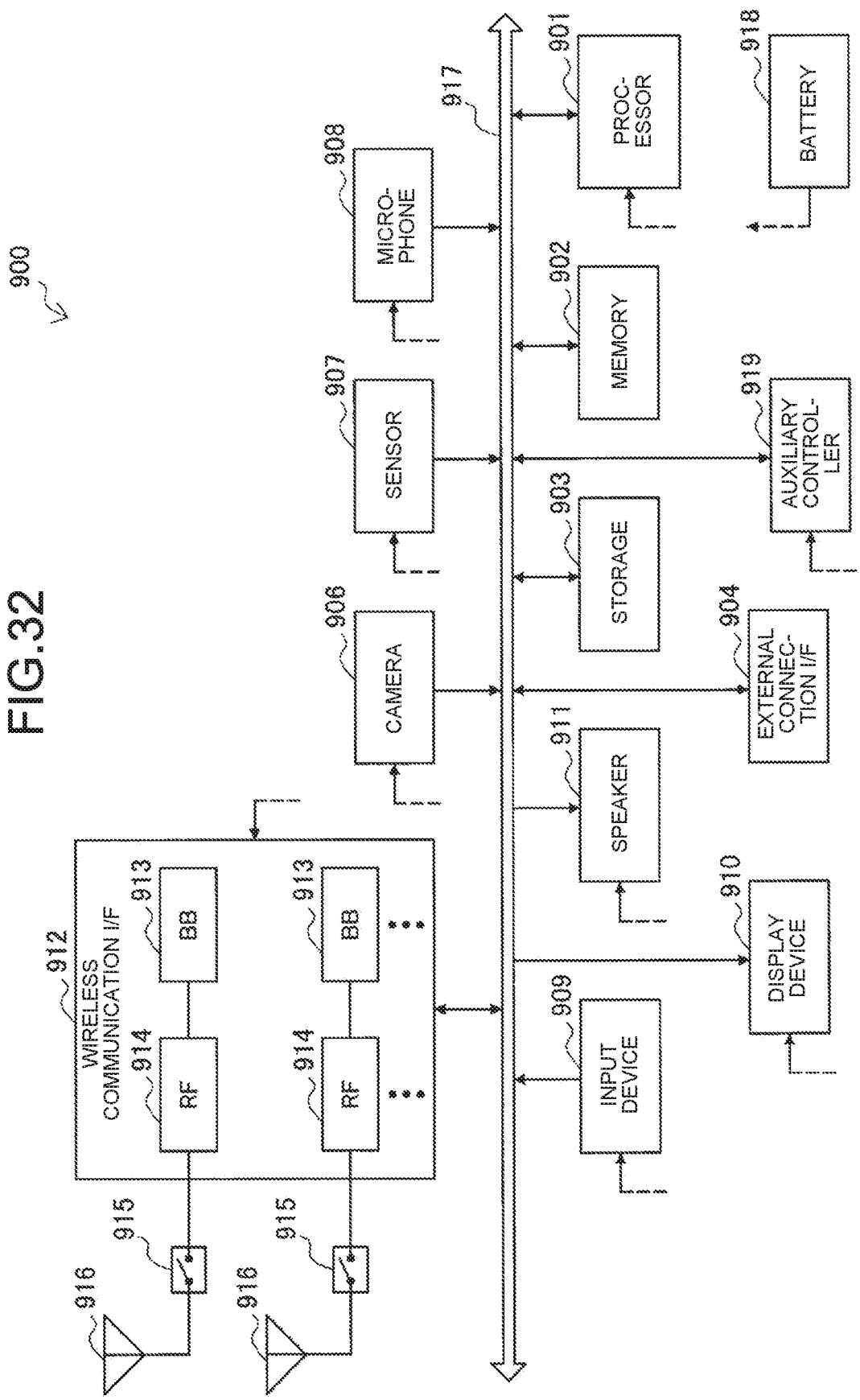
FIG. 32 is a block diagram illustrating an example of a schematic configuration of a smartphone to which the technology according to the present disclosure may be applied.

FIG. 32 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting an externally attached device such as memory cards and universal serial bus (USB) devices to the smartphone 900.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is input into the smartphone 900 to an audio signal. The input device 909 includes, for example, a touch sensor which detects that a screen of the display device 910 is touched, a key pad, a keyboard, a button, a switch, or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 32. Note that FIG. 32 illustrates an example in which the wireless communication interface 912 includes a plurality of BB processors 913 and a plurality of RF circuits 914, but the wireless communication interface 912 may include a single BB processor 913 or a single RF circuit 914.

The wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 32. Note that FIG. 32 illustrates an example in which the smartphone 900 includes a plurality of antennas 916, but the smartphone 900 may include a single antenna 916.

The smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 32 via a feeder line that is partially indicated by a broken line in the drawing. The auxiliary controller 919, for example, operates a minimally necessary function of the smartphone 900 in a sleep mode.

In the smartphone 900 illustrated in FIG. 32, the higher layer processing unit 201, the control unit 203, the receiving unit 205, and/or the transmitting unit 207 described with reference to FIG. 7 may be implemented in the wireless communication interface 912 (for example, the RF circuit 914 and/or the BB processor 913), the processor 901, and/or the auxiliary controller 919. For example, the wireless communication interface 912, the processor 901, and/or the auxiliary controller 919 receive the first control information and the second control information, or transmit control information request to receive the corresponding third control information. For example, in a processor included in the wireless communication interface 912, a function for performing these operations may be implemented. As a device that performs such an operation, the smartphone 900 or the above-described module may be provided, or a program for causing a processor to perform the above-described operation may be provided. Further, a readable recording medium on which the above-described program is recorded may be provided. Further, the transceiving antenna 209 may be implemented in the antenna 916.

Second Application Example

FIG. 33 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (for example, latitude, longitude, and altitude) of the car navigation device 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (for example, CD or DVD) inserted into the storage medium interface 928. The input device 929 includes, for example, a touch sensor which detects that a screen of the display device 930 is touched, a button, a switch, or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include a BB processor 934, an RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 33. Note that FIG. 33 illustrates an example in which the wireless communication interface 933 includes a plurality of BB processors 934 and a plurality of RF circuits 935, but the wireless communication interface 933 may include a single BB processor 934 or a single RF circuit 935.

The wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation device 920 may include a plurality of antennas 937 as illustrated in FIG. 33. Note that FIG. 33 illustrates an example in which the car navigation device 920 includes a plurality of antennas 937, but the car navigation device 920 may include a single antenna 937.

The car navigation device 920 may include the antenna 937 for each wireless communication system. In this case, the antenna switch 936 may be omitted from a configuration of the car navigation device 920.

The battery 938 supplies electric power to each block of the car navigation device 920 illustrated in FIG. 33 via a feeder line that is partially indicated by a broken line in the drawing. Further, the battery 938 accumulates the electric power supplied from the vehicle.

In the car navigation device 920 illustrated in FIG. 33, the higher layer processing unit 201, the control unit 203, the receiving unit 205, and/or the transmitting unit 207 described with reference to FIG. 7 may be implemented in the wireless communication interface 933 (for example, the RF circuit 935 and/or the BB processor 934) and/or the processor 921. For example, the wireless communication interface 933 and/or the processor 921 receive the first control information and the second control information, or transmit control information request to receive the corresponding third control information. For example, in a processor included in the wireless communication interface 933, a function for performing these operations may be implemented. As a device that performs such an operation, the car navigation device 920 or the above-described module may be provided, or a program for causing a processor to perform the above-described operation may be provided. Further, a readable recording medium on which the above-described program is recorded may be provided. Further, the transceiving antenna 209 may be implemented in the antenna 937.

The technology of the present disclosure may also be realized as an in-vehicle system (or a vehicle) 940 including one or more blocks of the above-described car navigation device 920, the in-vehicle network 941, and a vehicle module 942. The vehicle module 942 generates vehicle data such as vehicle speed, engine speed, and trouble information, and outputs the generated data to the in-vehicle network 941.

Incidentally, in the above description, gNB (gNodeB, next Generation NodeB) may be described as eNB.

3. CONCLUSION

As described above, according to the embodiment of the present disclosure, a resource can be effectively utilized by combining Pre-emption technology of transmitting more urgent data with lower delay with NOMA transmission.

Each Step in the processing executed by each device in this specification does not necessarily need to be processed in a time series in the order described as a sequence diagram or a flowchart. For example, each Step in the processing executed by each device may be processed in an order different from the order described in the flowchart, or may be processed in parallel. In each embodiment, this disclosure can be applied to a communication link such as a downlink, an uplink, or a sidelink.

A computer program for causing hardware such as a CPU, a ROM, and a RAM built in each device to exhibit functions equivalent to the configuration of each device described above can also be created. Further, a storage medium storing the computer program can be provided. Further, by configuring each functional block illustrated in the functional block diagram by hardware, a series of processing can be realized by hardware.

The preferred embodiments of the present disclosure have been described above in detail with reference to the accompanying drawings, but the technical scope of the present disclosure is not limited to such examples. It is obvious that a person with ordinary knowledge in the art to which the present disclosure pertains can come up with various changes or modifications within the scope of the technical idea described in the claims. Of course, it is understood that they belong to the technical scope of the present disclosure.

Further, the effects described in this specification are merely illustrative or exemplary and are not limited. That is, the technology according to the present disclosure can exhibit other effects that are apparent to those skilled in the art from the description of this specification in addition to or instead of the above effects.

Note that the following configurations also belong to the technical scope of the present disclosure.

(1)

A wireless communication device comprising:
a communication unit configured to transmit and receive a signal by wireless communication; and
a control unit configured to control use of a resource used for the wireless communication by the communication unit, wherein
a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and
the control unit controls whether the first channel in the resource used to transmit the another signal is used exclusively or used using by non-orthogonal multiplexing.

(2)

The wireless communication device according to claim (1), wherein
the resource used to transmit the another signal further has at least a second channel for control, and
the control unit controls whether the second channel in the resource used to transmit the another signal is used exclusively or used using by non-orthogonal multiplexing.

(3)

The wireless communication device according to claim (1) or (2), wherein the first channel is provided in a resource that does not require prior permission.

(4)

The wireless communication device according to any of claims (1)~(3), wherein the control unit causes the communication unit to provide notification of information indicating whether the first channel is used exclusively or used using by non-orthogonal multiplexing in a system information block (SIB).

(5)

The wireless communication device according to any of claims (1)~(3), wherein the control unit causes the communication unit to provide notification of information indicating whether the first channel is used exclusively or used using by non-orthogonal multiplexing in downlink control information (DCI).

(6)

The wireless communication device according to claim (5), wherein the control unit selects an identifier used in CRC scrambling of the DCI depending on whether the first channel is used exclusively or used using by non-orthogonal multiplexing.

(7)

The wireless communication device according to claim (5), wherein the control unit selects a predetermined group of resources transmitted by the DCI depending on whether the first channel is used exclusively or used using by non-orthogonal multiplexing.

(8)

The wireless communication device according to claim (5), wherein the control unit selects a search space transmitted by the DCI depending on whether the first channel is used exclusively or used using by non-orthogonal multiplexing.

(9)

The wireless communication device according to claim (5), wherein the control unit selects another format of the DCI depending on whether the first channel is used exclusively or used using by non-orthogonal multiplexing.

(10)

The wireless communication device according to any of claims (1)~(9), wherein the control unit causes the communication unit to provide notification of whether the first channel is used exclusively or used using by non-orthogonal multiplexing by using information used at a time of data retransmission.

(11)

The wireless communication device according to claim (10), wherein the information used at the time of data retransmission is information used at a time of a code block group (CBG) transmission.

(12)

The wireless communication device according to any of claims (1)~(11), wherein the another signal is transmitted to a second terminal device different from the first terminal device.

(13)

A wireless communication method, by a processor, comprising:

transmitting and receiving a signal by wireless communication; and controlling use of a resource used for the wireless communication by the communication unit, wherein a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and in a control of use of the resource, the control is performed about whether the first channel in the resource used to transmit the another signal is used exclusively or used using by non-orthogonal multiplexing.

(14)

A computer program for causing a computer to perform:

transmitting and receiving a signal by wireless communication; and controlling use of a resource used for the wireless communication by the communication unit, wherein a part of a resource used to transmit a signal by wireless communication with a first terminal device is used as a resource used to transmit another signal different from the signal exclusively or using by non-orthogonal multiplexing, and the resource used to transmit the another signal has at least a first channel for data, and in a control of use of the resource, the control is performed about whether the first channel in the resource used to transmit the another signal is used exclusively or used using by non-orthogonal multiplexing.

REFERENCE SIGNS LIST

1 BASE STATION DEVICE
2 TERMINAL DEVICE

The invention claimed is:

1. A wireless communication device comprising:
circuitry configured to:
    transmit and receive a signal by wireless communication;
    control use of a resource used for the wireless communication, wherein
    a part of the resource used to transmit the signal by the wireless communication with a first terminal device is used as a resource used to transmit another signal different from the signal exclusively or by use of non-orthogonal multiplexing, and the resource used to transmit the another signal has at least a first channel for data; and
    control whether the first channel in the resource used to transmit the another signal is used exclusively or by use of non-orthogonal multiplexing.

2. The wireless communication device according to claim 1, wherein
the resource used to transmit the another signal further has at least a second channel for control, and wherein the circuitry is further configured to:
    control whether the second channel in the resource used to transmit the another signal is used exclusively or by use of non-orthogonal multiplexing.

3. The wireless communication device according to claim 1, wherein the first channel is provided in a resource that does not require prior permission.

4. The wireless communication device according to claim 1, wherein the circuitry is further configured to provide a notification of information indicating whether the first channel is used exclusively or by use of non-orthogonal multiplexing in a system information block (SIB).

5. The wireless communication device according to claim 1, wherein the circuitry is further configured to provide a notification of information indicating whether the first channel is used exclusively or by use of non-orthogonal multiplexing in downlink control information (DCI).

6. The wireless communication device according to claim 5, wherein the circuitry is further configured to select an identifier used in CRC scrambling of the DCI depending on whether the first channel is used exclusively or by use of non-orthogonal multiplexing.

7. The wireless communication device according to claim 5, wherein the circuitry is further configured to select a predetermined group of resources transmitted by the DCI depending on whether the first channel is used exclusively or by use of non-orthogonal multiplexing.

8. The wireless communication device according to claim 5, wherein the circuitry is further configured to select a search space transmitted by the DCI depending on whether the first channel is used exclusively or by use of non-orthogonal multiplexing.

9. The wireless communication device according to claim 5, wherein the circuitry is further configured to select another format of the DCI depending on whether the first channel is used exclusively or by use of non-orthogonal multiplexing.

10. The wireless communication device according to claim 1, wherein the circuitry is further configured to provide a notification of whether the first channel is used exclusively or by use of non-orthogonal multiplexing by using information used at a time of data retransmission.

11. The wireless communication device according to claim 10, wherein the information used at the time of data retransmission is information used at a time of a code block group (CBG) transmission.

12. The wireless communication device according to claim 1, wherein the another signal is transmitted to a second terminal device different from the first terminal device.

13. A wireless communication method, by a processor, comprising:
    transmitting and receiving a signal by wireless communication; and
    controlling use of a resource used for the wireless communication, wherein
    a part of the resource used to transmit the signal by the wireless communication with a first terminal device is used as a resource used to transmit another signal different from the signal exclusively or by use of non-orthogonal multiplexing, and the resource used to transmit the another signal has at least a first channel for data, and
    in a control of use of the resource, the control is performed about whether the first channel in the resource used to transmit the another signal is used exclusively or by use of non-orthogonal multiplexing.

14. A non transitory computer-readable medium having stored thereon, computer-executable instructions which, when executed by a processor, cause the processor to execute operations, the operations comprising:

transmitting and receiving a signal by wireless communication; and controlling use of a resource used for the wireless communication, wherein a part of the resource used to transmit the signal by the wireless communication with a first terminal device is used as a resource used to transmit another signal different from the signal exclusively or by use of non-orthogonal multiplexing, and the resource used to transmit the another signal has at least a first channel for data, and in a control of use of the resource, the control is performed about whether the first channel in the resource used to transmit the another signal is used exclusively or by use of non-orthogonal multiplexing.

* * * * *